(12) United States Patent
Lee

(10) Patent No.: US 11,879,655 B2
(45) Date of Patent: Jan. 23, 2024

(54) AIR CONDITIONER

(71) Applicant: LG ELECTRONICS INC., Seoul (KR)

(72) Inventor: Kwonhyung Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 285 days.

(21) Appl. No.: 17/421,517

(22) PCT Filed: Jan. 10, 2020

(86) PCT No.: PCT/KR2020/000481
§ 371 (c)(1),
(2) Date: Jul. 8, 2021

(87) PCT Pub. No.: WO2020/145729
PCT Pub. Date: Jul. 16, 2020

(65) Prior Publication Data
US 2021/0333003 A1 Oct. 28, 2021

(30) Foreign Application Priority Data
Jan. 10, 2019 (KR) .................. 10-2019-0003227

(51) Int. Cl.
*F24F 11/56* (2018.01)
*H04W 12/03* (2021.01)
*H04J 14/00* (2006.01)

(52) U.S. Cl.
CPC ............ *F24F 11/56* (2018.01); *H04J 14/007* (2013.01); *H04W 12/03* (2021.01)

(58) Field of Classification Search
CPC ....... F24F 11/56; H04J 13/0018; H04J 14/007
(Continued)

(56) References Cited

U.S. PATENT DOCUMENTS 7,461,255 B2 * 12/2008 Iwamura ............ H04N 1/32283
380/54
2006/0019700 A1 1/2006 Seo et al.

FOREIGN PATENT DOCUMENTS

| JP | 58-31038 | 2/1983 |
|----|----------|--------|
| JP | 60-22051 | 5/1985 |

(Continued)

OTHER PUBLICATIONS

International Search Report (with English Translation) issued in Application No. PCT/KR2020/000481 dated May 8, 2020.

*Primary Examiner* — Leila Malek
(74) *Attorney, Agent, or Firm* — KED & ASSOCIATES

(57) ABSTRACT

An air conditioner is provided that includes a plurality of indoor units configured to be distributed and installed in a plurality of floors in a building; a controller configured to monitor and control the plurality of indoor units; and a wireless communication unit configured to transmit and receive data by the controller, the plurality of indoor units, and one outdoor unit using a wireless communication method. The wireless communication unit comprises a transmitter and a receiver using a Sub-GHz band frequency. The transmitter includes an optical orthogonal code generator configured to first cipher source data using an optical orthogonal code, and a narrow-band chaotic signal generator configured to secondarily cipher using a chaotic signal. The source data is sequentially encrypted through the optical orthogonal code generator and the narrowband chaotic signal generator and then transmitted.

10 Claims, 15 Drawing Sheets

(58) Field of Classification Search
USPC .......................................................... 375/275
See application file for complete search history.

(56) References Cited

FOREIGN PATENT DOCUMENTS

| KR | 10-0635535 | 10/2006 |
| KR | 10-2010-0123486 | 11/2010 |
| KR | 10-2018-0106476 | 4/2018 |
| KR | 10-0818246 | 4/2018 |

* cited by examiner

{0, 1, 4} Codeword

{0, 2, 7} Codeword

Autocorrelation

Cross-Correlation

AIR CONDITIONER

CROSS-REFERENCE TO RELATED PATENT APPLICATIONS

This application is a U.S. National Stage Application under 35 U.S.C. § 371 of PCT Application No. PCT/KR2020/000481, filed on Jan. 10, 2020, which claims priority to Korean Patent Application No. 10-2019-0003227, filed Jan. 10, 2019, whose entire disclosures are hereby incorporated by reference.

TECHNICAL FIELD

The present disclosure relates to an air conditioner, and more particularly, to an air conditioner that enables to perform wireless security communication between indoors and outdoors.

BACKGROUND ART

An air conditioner is installed to provide a more comfortable indoor environment to humans by discharging cold and hot air into a room to create a comfortable indoor environment, controlling an indoor temperature, and purifying an indoor air. In general, an air conditioner includes an indoor unit which is composed of a heat exchanger and installed indoors, and an outdoor unit which is composed of a compressor and a heat exchanger and supplies a refrigerant to the indoor unit.

The air conditioner is divided and controlled into an indoor unit composed of a heat exchanger and an outdoor unit composed of a compressor and a heat exchanger. The outdoor unit and the indoor unit are connected by a refrigerant pipe, and the refrigerant compressed from the compressor of the outdoor unit is supplied to the heat exchanger of the indoor unit through the refrigerant pipe. The refrigerant heat-exchanged in the heat exchanger of the indoor unit flows back into the compressor of the outdoor unit through the refrigerant pipe. Accordingly, the indoor unit discharges cold and hot air into the room through heat exchange using a refrigerant.

Units in an air conditioner system may be interconnected in a building unit or a small group unit to transmit/receive data, and may monitor and control the state of each unit through the transmitted/received data.

In transmitting and receiving data between the indoor unit and the outdoor unit, since a conventional commercial wireless communication such as Wi-Fi, ZigBee, and Z-wave uses a 2.4 GHz or 5 GHz high-frequency band, there is a problem in that a long-distance wireless communication between floors or walls in a building is difficult.

In addition, in wireless communication, code division multiple access (CDMA) is used to accomplish a multi-user division or a secret communication. In the CDMA method, a unique Pseudo Noise (PN) code is assigned to each user for a communication to accomplish a user classification and a multiplexing access, and decoding can be performed only when a user code is recognized, thereby achieving a secret communication.

In this case, since a sine wave is used as a carrier signal in a general wireless communication, a separate synchronization method is required in reception. In particular, since the CDMA method uses a coherent receiver having a rake reception function, the hardware configuration is complicated.

As a result, such a communication method has a problem in that it is difficult to implement a low-cost, low-complexity, low-power, long-distance wireless communication system for a wireless communication between an indoor unit and an outdoor unit.

DISCLOSURE

Technical Problem

A first object to be solved by the present disclosure is to provide an air conditioner having a wireless communication system that enables communication passing through a plurality of floors and walls.

A second object of the present disclosure to be solved by the present disclosure is to provide an air conditioner having a wireless communication system with a simple hardware configuration.

A third object to be solved by the present disclosure is to provide an air conditioner having a wireless communication system for implementing a low-cost, low-complexity, and low-power communication system.

The problems of the present disclosure are not limited to the problems mentioned above, and other problems not mentioned will be clearly understood by those skilled in the art from the following description.

Technical Solution

In order to achieve the above objects, an air conditioner according to the present disclosure includes: a plurality of indoor units configured to be distributed and installed in a plurality of floors in a building; a controller configured to monitor and control the plurality of indoor units; and a wireless communication unit configured to transmit and receive data by the controller, the plurality of indoor units, and one outdoor unit by using a wireless communication method; wherein the wireless communication unit comprises a transmitter and a receiver using a Sub-GHz band frequency, wherein the transmitter includes: an optical orthogonal code generating unit configured to first cipher source data using an optical orthogonal code; and a narrowband chaotic signal generating unit configured to secondarily cipher by using a chaotic signal, wherein the data is sequentially encrypted through the optical orthogonal code generating unit and the narrowband chaotic signal generating unit and then transmitted.

The receiver further includes: an envelope detector configured to detect an envelope; and a decoder configured to decode data received through the envelope detector in a form of a codeword.

The air conditioner further includes a de-mapping unit for restoring a codeword received through the envelope detector.

The transmitter further includes: a source unit configured to constitute a transmission data source before the first ciphering; a serial-parallel mixing unit configured to be in charge of a pre-processing process of converting transmission data of the source unit into a codeword; and a mapping unit configured to convert the transmission data processed through the serial-parallel mixing unit into a codeword.

The optical orthogonal code generating unit firstly ciphers the codeword converted through the mapping unit by using the optical orthogonal code.

The transmitter further includes: an amplifying unit configured to amplify data encrypted through the first and second cipherings; and a transmitting antenna unit configured to transmit the data amplified through the amplifying unit.

The receiver further includes: a receiving antenna unit configured to receive data transmitted through the transmitter; and a low-noise amplifying unit configured to remove noise of the data received through the receiving antenna unit and amplify a signal.

The present disclosure further includes a storage unit configured to store control data for controlling operation, communication data for setting an address or a group for communication with other unit, data transmitted and received from the outside, and operation data generated or detected during operation.

The present disclosure further includes an input unit configured to apply input data to the controller, when a user command or certain data is input.

The present disclosure further includes an output unit configured to output audio or image.

Advantageous Effects

The air conditioner according to the present disclosure provides a long-distance transmission technique that enables to overcome obstacles in multiple floors and walls in a building and perform a communication, by using RF of Sub-GHz band.

In addition, the air conditioner according to the present disclosure provides an effect of enabling asynchronous reception with a correlation characteristic that the optical orthogonal code has as well as the ciphering characteristic, by firstly ciphering the transmission data by using the optical orthogonal code so as to achieve a wireless security.

In addition, the air conditioner according to the present disclosure has an advantage in that non-coherent reception as well as ciphering characteristics is possible, by secondary ciphering the transmission signal by using a chaotic signal having excellent ciphering characteristics instead of using a general sine wave.

In addition, the air conditioner according to the present disclosure can provide a long-distance wireless communication transmission technique within a building characterized by wireless security, low cost, low complexity, and low power in wireless communication between an indoor/outdoor unit of air conditioner and a controller.

The effects of the present disclosure are not limited to the effects mentioned above, and other effects not mentioned will be clearly understood by those skilled in the art from the description of the claims.

MODE FOR INVENTION

Figure 1:
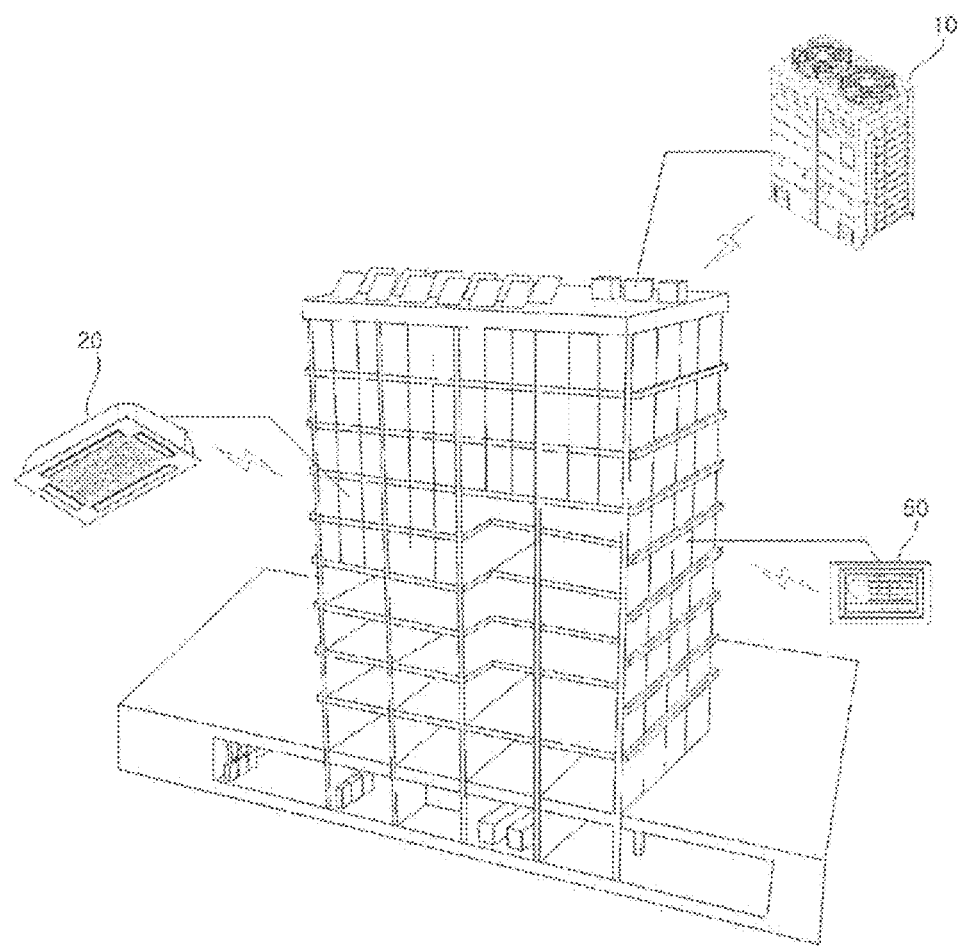
FIG. 1 is a diagram schematically illustrating a configuration in which an air conditioner system is installed in a building according to an embodiment of the present disclosure.

FIG. 1 is a diagram schematically illustrating a configuration in which an air conditioner system is installed in a building according to an embodiment of the present disclosure.

Referring to FIG. 1, the air conditioner system may include an outdoor unit 10, an indoor unit 20, and a controller 50.

In addition to the indoor unit and the outdoor unit, the air conditioner system may include a ventilation device, an air purifier, a humidifier, a heater, and the like, and may further include a unit such as a chiller, an air conditioning unit, a cooling tower, and the like depending on a size. In the air conditioner system, each unit may be interconnected to operate in conjunction with the operation of the indoor unit and the outdoor unit. In addition, the air conditioner system may operate in connection with a mobile device, a security device, an alarm device, and the like inside a building.

The air conditioner system according to an embodiment of the present disclosure may include a remote control device capable of remotely monitoring and controlling the operating state of units.

The remote control device, including a wireless communication module 120, may communicate with other units using a Sub-GHz band frequency, and may monitor other units.

Here, the remote control device may be a controller 50 capable of controlling one or more units, a wired/wireless remote controller 60, and a mobile terminal 200.

The controller 50 may control the operation of the indoor unit 20 and the outdoor unit 10 in response to an input user command, periodically receive and store data on a corresponding operating state of the indoor unit and the outdoor unit, and output the operating state through the monitoring screen. The controller 50 may perform operation setting, lock setting, schedule control, group control, peak control for power use, demand control, and the like for the indoor unit 20.

Each of the outdoor units 10 is connected to the indoor unit 20 by a refrigerant pipe to supply the refrigerant to the indoor unit 20. In addition, the outdoor unit 10 periodically communicates with a plurality of indoor units 20 to transmit/receive data to and from each other, and change the operation according to the operation setting changed from the indoor unit.

The indoor unit 20 may include an electronic expansion valve (not shown) that expands the refrigerant supplied from the outdoor unit 10, an indoor heat exchanger (not shown) that exchanges heat with the refrigerant, an indoor unit fan (not shown) that allows indoor air to flow into the indoor heat exchanger and exposes the heat-exchanged air to the room, a plurality of sensors (not shown), and a control means for controlling the operation of the indoor unit (not shown).

In addition, the indoor unit 20 includes a discharge port (not shown) for discharging heat-exchanged air, and the discharge port is provided with a wind direction control means (not shown) for opening and closing the discharge port and controlling the direction of the discharged air. The indoor unit controls a sucked air and a discharged air by controlling the rotation speed of a indoor unit fan, and adjusts the air volume. The indoor unit 20 may further include an output unit for displaying the operation state and setting information of the indoor unit and an input unit for inputting setting data. In this case, the indoor unit 20 may transmit setting information for operation of the air conditioner to a connected remote controller (not shown), output the setting information through the remote controller, and receive data.

A remote controller (not shown) is connected to the indoor unit by a wired or wireless communication method, inputs a user command to the indoor unit, and receives and outputs data of the indoor unit. The remote control may transmit a user command to the indoor unit according to a connection method with the indoor unit, and perform one-way communication in which data of the indoor unit is not received or perform two-way communication in which data is transmitted/received to/from the indoor unit.

The outdoor unit 10 operates in a cooling mode or a heating mode in response to data received from the connected indoor unit 20 or a control command of the controller, and supplies refrigerant to the connected indoor unit.

When a plurality of outdoor units are connected, each outdoor unit may be connected to a plurality of indoor units and, furthermore, may supply a refrigerant to a plurality of indoor units through a distributor.

The outdoor unit 10 may include at least one compressor that compresses the refrigerant to discharge a high-pressure gas refrigerant, an accumulator that separates a gas refrigerant and a liquid refrigerant from the refrigerant to prevent non-vaporized liquid refrigerant from flowing into the compressor, an oil recoverer that recovers oil from the compressor, an outdoor heat exchanger that condenses or evaporates the refrigerant by heat exchange with the outside air, an outdoor fan that flows air into the outdoor heat exchanger and discharges the heat-exchanged air to the outside in order to easily accomplish heat exchange in the outdoor heat exchanger, a four-way valve that changes a refrigerant flow path according to the operation mode of the outdoor unit, at least one pressure sensor for measuring pressure, at least one temperature sensor for measuring temperature, and a control component that controls the operation of the outdoor unit and communicate with other unit. The outdoor unit 10 may further include a plurality of other sensors, a valve, a supercooler, and the like, but a description thereof will be omitted below.

In addition, the air conditioner system may transmit/receive data to and from other air conditioner through a network connection such as the Internet. The air conditioner may access an external service center, management server, database, or the like through the controller, and may communicate with an external terminal accessed through a network. The terminal may access at least one unit of the air conditioner system and monitor and control the operation of the air conditioner system as a second controller.

In addition, the outdoor unit 10, the indoor unit 20, the controller 50, or the like may directly communicate with each other in a certain wireless communication method, and the outdoor unit 10, the indoor unit 20, the controller 50, or the like may directly communicate with a mobile terminal or the like in a certain wireless communication method. Accordingly, a user may freely monitor the state of each unit through the mobile terminal, and control each unit.

The air conditioner system according to an embodiment of the present disclosure may include a plurality of indoor units 20 and at least one outdoor unit 10 that perform wireless communication with each other.

Figure 2:
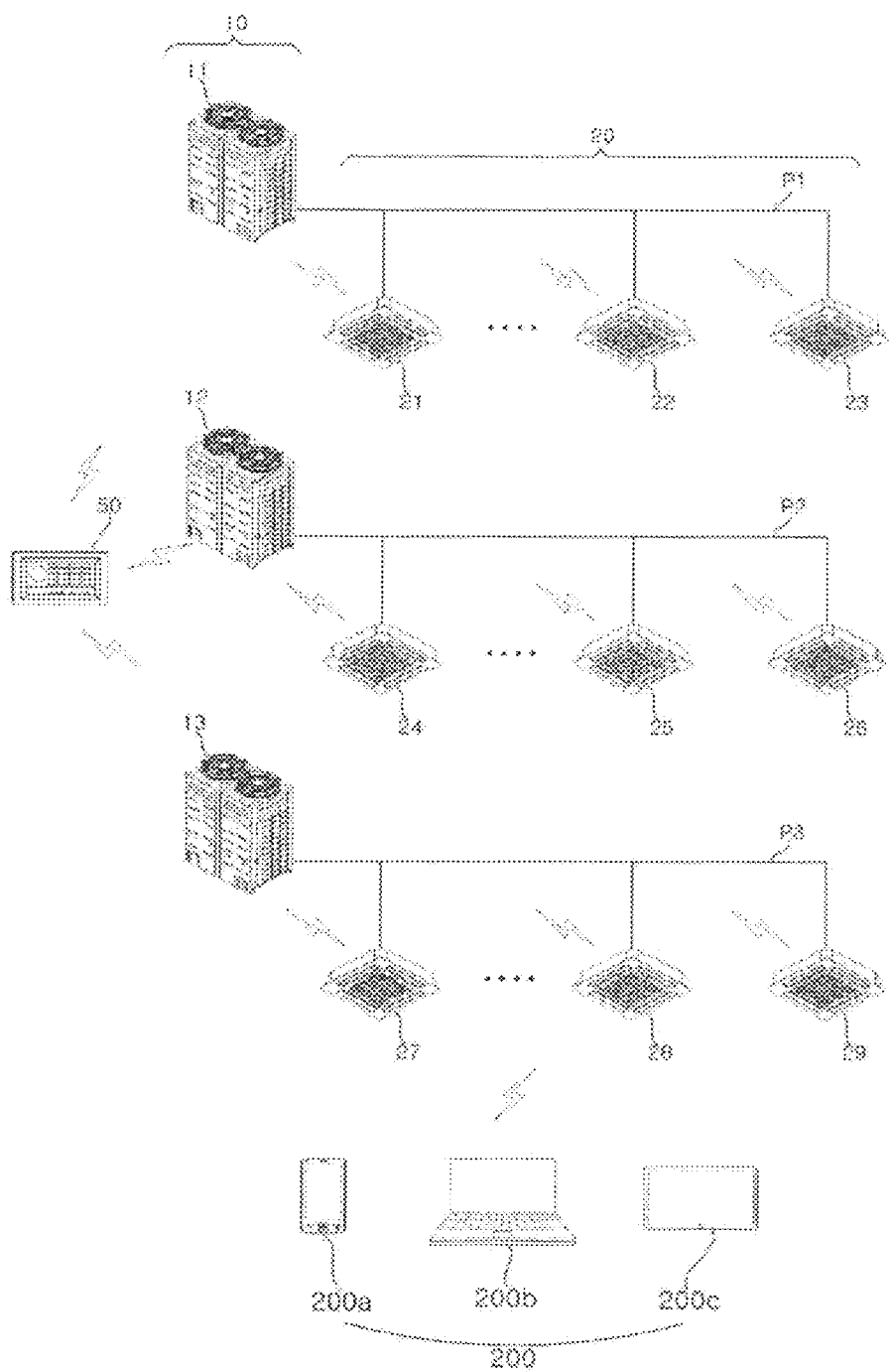
FIG. 2 is a diagram illustrating a configuration of an air conditioner system according to an embodiment of the present disclosure.

FIG. 2 is a diagram illustrating a configuration of an air conditioner system according to an embodiment of the present disclosure.

Referring to FIG. 2, in the air conditioner system according to an embodiment of the present disclosure, a plurality of indoor units 20, a plurality of outdoor units 10, and a controller 50 may transmit/receive data using a wireless communication method.

The outdoor unit 10 may be connected to the plurality of indoor units 20 and the refrigerant pipe P1, P2, P3, respectively, and may transmit/receive data through a wireless communication method.

The outdoor unit 10 periodically communicates with the plurality of indoor units 20 to transmit and receive data to and from each other, and changes operation according to operation setting changed from the indoor unit. The plurality of outdoor units 10 and the plurality of indoor units 20 may transmit/receive data through a wireless communication method.

The indoor unit 20 may communicate with the outdoor unit 10 as well as communicate with the controller 50 in a wireless communication method.

A first outdoor unit 10 is connected to first to third indoor units 21 to 23 by a first refrigerant pipe P1, a second outdoor unit 12 is connected to fourth to sixth indoor units 23 to 26 by a second refrigerant pipe P2, and a third outdoor unit 13 is connected to seventh to ninth indoor units 27 to 29 by a third refrigerant pipe P3. For convenience of explanation, it is explained that three indoor units are connected to each outdoor unit, but this is just an example, and it should be noted that it is not limited to the number of indoor units or the shape of the indoor units.

As the first outdoor unit 11 operates, the refrigerant is supplied from the first outdoor unit 10 to the first to third indoor units, the refrigerant is supplied to the fourth to sixth indoor units 23 to 26 through a second refrigerant pipe P2 by the operation of the second outdoor unit 12, and the refrigerant is supplied from the third outdoor unit 13 to the seventh to ninth indoor units 27 to 29 through the third refrigerant pipe P3.

A group of the air conditioner may be set based on the outdoor unit, and each group may communicate using a different channel. Since the indoor unit performs heat exchange based on the refrigerant supplied from the outdoor unit to discharge hot and cold air, the indoor unit and the outdoor unit connected through the refrigerant pipe may be set as a single group.

For example, the first outdoor unit 11 forms a first group with the first to third indoor units 21 to 23 which are connected to the first outdoor unit 11 by the first refrigerant pipe P1, the second outdoor unit 12 forms a second group with the fourth to sixth indoor units 24 to 26 which are connected to the second outdoor unit 12 by the second refrigerant pipe P2, and the third outdoor unit 13 may form a third group with the seventh to ninth indoor units 27 to 29 which are connected to the third outdoor unit 13 by the third refrigerant pipe P3. The outdoor unit and the controller may also be grouped according to the installation location. In some embodiments, the connection state by the refrigerant pipe may be classified based on the temperature change of the indoor unit due to the refrigerant supply of the outdoor unit by operating the outdoor unit and the indoor unit.

Meanwhile, at least, units included in the same group may perform wireless communication with each other. In addition, within the Sub-GHz frequency band, it may be allocated for each group in which a different communication channel is set. That is, by communicating using different communication channels for each group, the interference phenomenon can be prevented.

Meanwhile, the controller 50 may communicate with the indoor unit 20 or the outdoor unit 10 regardless of a group.

The controller 50 controls the operation of a plurality of indoor units 20 and the outdoor units 10 in response to an input user command, periodically receives and stores data on the operation state of a plurality of indoor units and outdoor units corresponding thereto, and outputs the operation state through a monitoring screen.

The controller 50 may be connected to a plurality of indoor units 20 and perform operation setting, lock setting, schedule control, group control, peak control for power use, demand control, and the like for the indoor unit. In addition, the controller 50 communicates with the outdoor unit to control the outdoor unit and monitor the operation of the outdoor unit.

When a plurality of controllers 50 are provided, the controllers may transmit/receive data through mutual wireless communication, and may also be connected to an external controller through a certain external network.

When the controller and a plurality of units transmit and receive data in a wireless communication method, an address for communication is stored in the controller and each unit. Each address may be assigned by the outdoor unit and the controller.

As described above, the outdoor unit may set a group with the indoor unit that is connected by the refrigerant pipe. In this case, the outdoor unit may assign an address to the indoor unit included in the same group. In addition, even if a group is set based on the outdoor unit, it communicates with all outdoor units and all indoor units. Accordingly, the controller may allocate an address for central control to the plurality of units in addition to an address for group-based communication. In some cases, the controller may use the address assigned to the outdoor unit and the indoor unit as an address for central control without a separate address assignment.

Meanwhile, each unit of the air conditioner system such as the outdoor unit 10, the indoor unit 20, and the controller 50 may wirelessly communicate with the mobile terminal 200.

Referring to FIG. 2, the air conditioner system according to an embodiment of the present disclosure may include a mobile terminal 200 that can check and control the states of an electronic device (unit) such as the outdoor unit 10, the indoor unit 20, and the controller 50 and an electronic device inside the system.

The mobile terminal 200 may include an application for controlling the air conditioner system, and may check and control the state of the air conditioner system through execution of the application.

The mobile terminal 200 may be, for example, a smart phone 200a, a notebook PC 200b, a tablet PC 200c, or the like having an application for an air conditioner system.

Figure 3A:
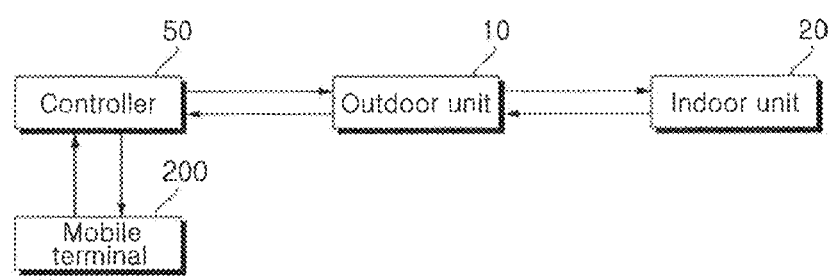
FIGS. 3A-3B are diagrams referenced in a description of a communication of an air conditioner system according to an embodiment of the present disclosure.
Figure 3B:
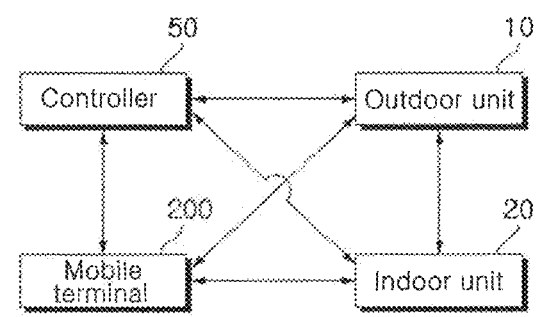

FIG. 3 is a diagram referenced in a description of a communication of an air conditioner system according to an embodiment of the present disclosure, FIG. 3A is a diagram illustrating communication between units using wired communication, and FIG. 3B is a diagram referenced to explain communication between units using wireless communication according to the present disclosure.

Referring to FIG. 3A, the air conditioner system is connected to a plurality of units through a communication line. Since the plurality of units are limited in the connection of the communication line, they are not connected one-to-one with each other, but are connected in stages according to the connection type of the communication line.

The plurality of indoor units are connected to a single outdoor unit through a communication line, and the outdoor unit is connected to the controller. When a plurality of outdoor units are provided, the plurality of indoor units are connected to the outdoor unit based on the connection state of the refrigerant pipe. The plurality of outdoor units are connected to the controller.

The indoor unit transmits data to the outdoor unit, and the outdoor unit transmits outdoor unit data and received indoor unit data to the controller. The controller may check the operation state of the indoor unit based on the data received from the outdoor unit.

When the controller transmits a control command to the indoor unit, the controller transmits the control command to the outdoor unit to which a corresponding indoor unit is connected, and the outdoor unit transmits the received control command to a corresponding indoor unit.

As described above, in the case of wired communication, data is transmitted in stages according to the connection state of the communication line, rather than being connected one-to-one between a plurality of units.

Accordingly, since data of the indoor unit cannot be directly transmitted, a time delay occurs in data transmission. In addition, since the outdoor unit has to process data of other unit excluding the outdoor unit data, a corresponding load increases. In addition, since a single outdoor unit has to process data of a plurality of indoor units, it takes a lot of time to transmit data according to the number of connected indoor units.

In addition, even when the state of units is monitored through the mobile terminal 200, since data of the indoor unit cannot be directly transmitted, data can be transmitted/received via the controller 50, or the like. Therefore, the mobile terminal 200 cannot freely communicate with each unit of the air conditioner system, and has a limit that it receives only corresponding information from a specific unit, or has to communicate with a superior controller 50 in order to obtain entire information.

As shown in FIG. 3B, the outdoor unit 10, the indoor unit 20, the controller 50, and the mobile terminal 200 transmit and receive data in a mutual wireless communication method.

The controller 50 and/or the mobile terminal 200 may request data from the outdoor unit 10 and the indoor unit 20, respectively, may determine the operating state of each unit based on the data respectively received from the outdoor unit 10 and the indoor unit 20, and may determine a failure.

As described above, it is described that a group is set between the outdoor unit and the indoor unit in consideration of the flow of the refrigerant. However, in addition to the communication channel between the outdoor unit and the indoor unit, a communication channel including the controller, the outdoor unit, and the indoor unit may be separately set.

The controller 50 and/or the mobile terminal 200 may change the operation setting of the indoor unit 20 according to the state (temperature or humidity) of the indoor space in which the indoor unit 20 is installed, based on the data received from the indoor unit 20, and may directly transmit data according to the operation setting change to the indoor unit. At this time, when the operation setting is changed, the indoor unit may transmit corresponding data to the outdoor unit, and thus, the outdoor unit also changes the operation.

When a schedule is set so that the indoor unit 20 performs a set operation at a specified time, the controller 50 may transmit an operation command to each of the indoor unit and the outdoor unit connected to the indoor unit, and the indoor unit transmits a corresponding response to the controller 50, and transmits data on the operating state at certain time intervals.

The indoor unit 20 sets operation and transmits data to the outdoor unit in response to data input through a provided input unit or data received from the controller 50.

The outdoor unit 10 controls the compressor by calculating a load according to the received indoor unit data and the operating state of the plurality of indoor units.

The outdoor unit 10 and the indoor unit 20 may transmit data to the controller 50 at certain time intervals, and may transmit data on a failure or error to the controller 50 irrespective of a cycle when the failure or error occurs.

Figure 4:
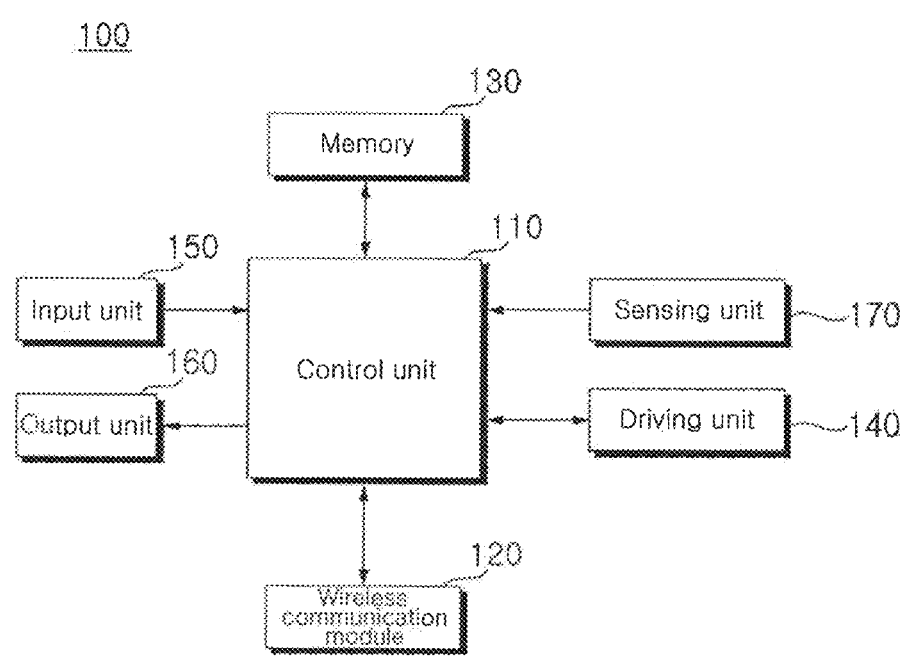
FIG. 4 is a block diagram schematically illustrating a control configuration of a unit of an air conditioner system according to an embodiment of the present disclosure.

FIG. 4 is a block diagram schematically illustrating a control configuration of a unit of an air conditioner system according to an embodiment of the present disclosure.

An electronic device according to an embodiment of the present disclosure may be a unit 100 in the air conditioner system. For example, the electronic device according to an embodiment of the present disclosure may be one of an indoor unit, an outdoor unit, a controller, and a wireless sensor of an air conditioner system.

Referring to FIG. 4, the unit 100 of the air conditioner system may include a driving unit 140, a sensing unit 170, an output unit 160, an input unit 150, a storage unit 130, and a control unit 110 that controls overall operation.

In addition, the unit 100 may include a wireless communication module 120 or may be connected to the wireless communication module 120. The wireless communication module 120 may be built in the unit or installed outside the unit.

This is a configuration commonly included in each unit 100, and a separate configuration may be added according to the characteristics of a product.

For example, the indoor unit 20 may include a vane or the like as a wind direction control means, and as it includes an indoor unit fan and a plurality of valves, an indoor unit fan driving unit, a valve control unit, a wind direction control unit, and the like may be provided, respectively.

Meanwhile, the outdoor unit 10 may include a compressor, an outdoor unit fan, and a plurality of valves. Accordingly, the driving unit of the outdoor unit may be divided into a compressor driving unit, an outdoor unit fan driving unit, and a valve control unit.

Meanwhile, depending on the type of the unit, the type, the number, and the installation position of sensor included in the sensing unit 170 may be differently configured.

The storage unit 130 stores control data for controlling the operation of the unit 100, communication data for setting address or group for communication with other unit, data transmitted and received from the outside, and operation data generated or detected during operation. The storage unit 130 stores an execution program for each function of the unit, data for operation control, and transmitted/received data.

In terms of hardware, the storage unit 130 may be various storage devices such as ROM, RAM, EPROM, flash drive, and hard drive.

The input unit 150 includes at least one input means such as a button, a switch, and a touch input means. When a user command or certain data is input in response to the manipulation of the input means, the input unit 150 applies the input data to the control unit 110. The outdoor unit may include a power key, a test operation key, and an address setting key, and the indoor unit may include a power key, a menu input key, an operation setting key, a temperature control key, an air volume key, a lock key, and the like.

The output unit 160 may include at least one of a lamp controlled to be turned on or off, an audio output unit having a speaker outputting a certain sound, and a display and output the operating state of the unit. The lamp outputs whether the unit is operating according to lighting of the lamp, lighting color, or blinking, and the speaker outputs an operation state by outputting a certain warning sound and sound effect. The display may output a menu screen for controlling the unit, and may output the operation setting or operating state of the unit as a guide message or warning composed of a combination of at least one of characters, numbers, and images.

The sensing unit 170 may include a plurality of sensors. The sensing unit 170 may include a pressure sensor, a temperature sensor, a gas sensor, a humidity sensor, and a flow sensor.

For example, a plurality of temperature sensors are provided to detect an indoor temperature, an outdoor temperature, an indoor heat exchanger temperature, an outdoor heat exchanger temperature, and a pipe temperature, and input them to the control unit 110. The pressure sensors are respectively installed in an inlet and outlet of the refrigerant pipe, measure the pressure of introducing refrigerant and the pressure of discharged refrigerant, respectively, and input them to the control unit 110. The pressure sensor may be installed in a water pipe as well as in the refrigerant pipe.

The driving unit 140 supplies operating power to a control target according to a control command of the control unit 110 and controls the driving of the control target. As described above, in the case of the outdoor unit, the driving unit 140 may include a compressor driving unit, an outdoor unit fan driving unit, and a valve control unit for controlling a compressor, an outdoor unit fan, and a valve, respectively. The driving unit 140 applies operating power to a motor provided in each of the compressor, the outdoor unit fan, the valve, and the like to perform a specified operation as the motor operates.

Figure 5:
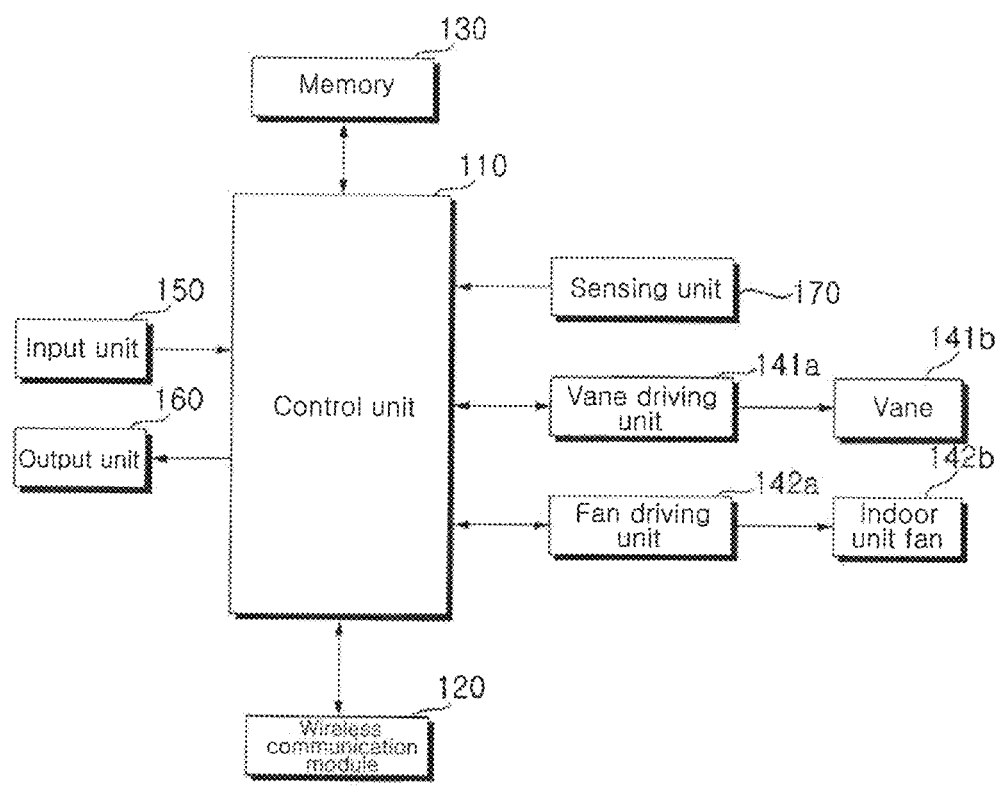
FIG. 5 is a block diagram schematically illustrating a control configuration of an indoor unit according to an embodiment of the present disclosure.

FIG. 5 is a block diagram schematically illustrating a control configuration of an indoor unit according to an embodiment of the present disclosure, and illustrates a case where the unit 100 is an indoor unit 100a.

FIG. 5 illustrates an example of the driving unit 140 of FIG. 4 when the unit 100 is the indoor unit 100a, and descriptions of the same parts as those of FIG. 4 will be omitted below.

Referring to FIG. 5, the indoor unit 100a may include a vane driving unit 141a, a fan driving unit 142a, an indoor unit fan 142b, and one or more vanes 141b.

The indoor unit fan 142b discharges a cold/hot air heat-exchanged by the heat exchanger into the room through a discharge port.

The fan driving unit 142a controls a driving of the motor that operates the indoor unit fan 142b. The fan driving unit 142a controls the indoor unit fan 142b to be turned on/off, and controls the indoor unit fan 142b to operate at a set speed, in response to a control signal from the control unit 110.

The vane driving unit 141a controls opening and closing of one or more vanes 141b provided in one or more discharge ports, in response to a control signal from the control unit 110. In addition, the vane driving unit 141a controls the opening angle of each of the vanes 141b to change the discharged wind direction. The opening angle of the vane 141b is varied by the vane driving unit 141a to change the wind direction of the discharged air. At this time, each discharge port may further include a louver for adjusting the wind direction in the left and right direction.

Each of the vanes 141b may have an opening angle set within a range of 0 degrees to 90 degrees, and the opening angle may be changed step by step according to the setting.

The vane driving unit 141a may change the opening angle of each vane 141b step by step according to a control command of the control unit 110 to set it.

For example, the vane driving unit 141a may control the opening angle of the vane in five steps within a range of 15 to 75 degrees in units of 15 degrees. The opening angle of the vane 141b may be set in three to nine steps according to the setting. In addition, the vane driving unit 141a may continuously change the opening angle of the vane within a range of 15 degrees to 75 degrees without step division when setting a swing mode.

Figure 6:
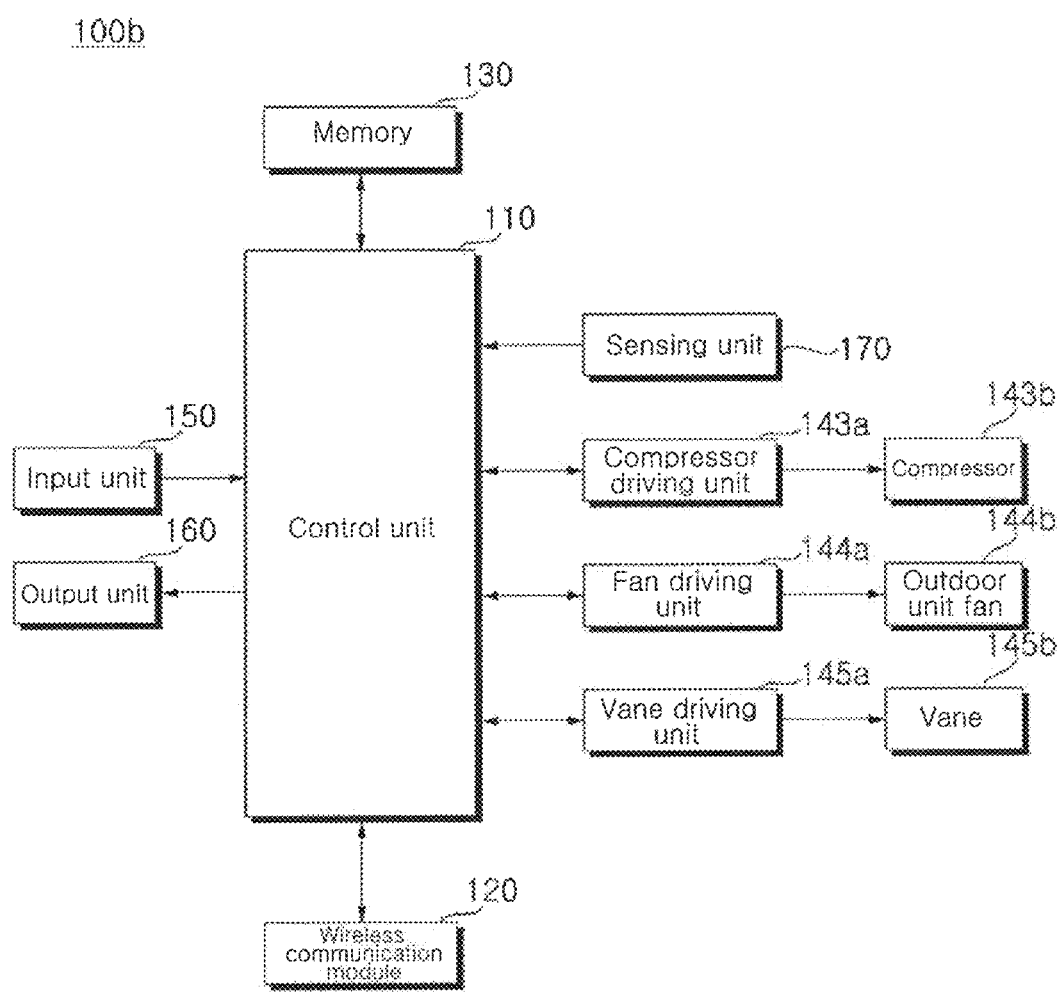
FIG. 6 is a block diagram schematically illustrating a control configuration of an outdoor unit according to an embodiment of the present disclosure.

FIG. 6 is a block diagram schematically illustrating a control configuration of an outdoor unit according to an embodiment of the present disclosure, and illustrates a case in which the unit 100 is an outdoor unit 100b.

FIG. 6 illustrates an example of the driving unit 140 of FIG. 4 when the unit 100 is the outdoor unit 100b, and descriptions of the same parts as those of FIG. 4 will be omitted below.

Referring to FIG. 6, the outdoor unit 100b may include a compressor driving unit 143a, a compressor 143b, an outdoor unit fan 144b, a fan driving unit 144a, a valve control unit 145a, and a valve 145b.

The outdoor unit fan 144b supplies outdoor air to the outdoor heat exchanger through a rotating operation of the fan, and allows the heat-exchanged cold/hot air to be discharged to the outside. As the outdoor heat exchanger operates as a condenser during cooling operation and as an evaporator during heating operation, the outdoor unit fan 144b may discharge the cold or hot air heat-exchanged in the outdoor heat exchanger to the outside.

The fan driving unit 144a may control the driving of the motor included in the outdoor unit fan 144b to control the rotating operation of the outdoor unit fan. The fan driving unit 144a may allow the outdoor unit fan 144b to operate at a set rotation speed or to stop operating, in response to a control signal from the control unit 110. The fan driving unit 144a may control the rotation speed of the outdoor unit fan 144b by applying an operation signal according to a shape of the motor provided in the outdoor unit fan 144b.

The valve control unit 145a may control the flow rate of the refrigerant or the flow direction of the refrigerant by controlling opening or closing, or opening degree with respect to a plurality of valves 145b provided in the outdoor unit. Since a plurality of valves 145b exist at different positions, a plurality of valve driving units may also be provided. The valve may include a four-way valve, an expansion valve, a hot gas valve, and the like.

The compressor 143b compresses and discharges the introduced refrigerant to circulate the refrigerant from the outdoor unit to the indoor unit. When a low-temperature and low-pressure gas refrigerant is introduced, the compressor 143b may compress it and discharge a high-temperature and high-pressure gas refrigerant.

The compressor driving unit 143a controls the operating power supplied to the motor provided in the compressor 143b, and accordingly controls the operating frequency of the compressor. The compressor driving unit 143a may include an inverter controlling the driving of the compressor.

Referring to FIGS. 4 to 6, each unit may include a wireless communication module 120.

The wireless communication module 120 supports at least one wireless communication method, and may communicate with other unit according to a control command of the control unit 110. The wireless communication module 120 may transmit/receive data using a wireless communication method specified between the controller, the outdoor unit, and the indoor unit, and may apply the received data to the control unit.

The wireless communication module 120 may set an address for communication between units, convert transmitted/received data, and process signals. When starting operation of the unit, the wireless communication module 120 may search for a unit of the same frequency band through wireless communication and check the connection. The wireless communication module 120 may perform communication by allocating a temporary address or setting a received temporary address during initial operation. In addition, when performing address setting in response to a control command of the control unit 110, the wireless communication module 120 may request a product number from the control unit 110 and set an address based on the product number. In this case, the product number may be the unit's unique number, serial number, MAC address, or the like.

The control unit 110 may control data input/output through the input unit 150 and the output unit 160, manage data stored in the storage unit 130, and control transmission/reception of data through the communication unit 200. The control unit 110 may detect a connection state and a communication state of the communication unit 200 through the connection unit 120, and determine an error.

The control unit 110 may generate a control command to operate according to a request from other unit or set operation settings and apply the generated control command to the driving unit 140. Accordingly, the driving unit 140 allows the connected components, e.g., a compressor, an outdoor unit fan, a valve, an indoor unit fan, and a wind direction control means, to operate respectively.

In addition, while the unit is in operation, the control unit 110 may determine an operating state in response to data input from a plurality of sensors of the sensing unit 170, determine a failure, and output an error.

The wireless communication module 120 may be provided in the unit 100 or may be connected to the unit 100 through an interface (not shown). The wireless communication module 120 may receive and transmit data of the unit through the interface, and may apply the received data to the unit.

Preferably, the wireless communication module 120 may communicate wirelessly using a frequency of a Sub-GHz band so as to be able to communicate with walls, floors, obstacles, etc. within a building. Since the frequency of the Sub-GHz band has excellent transmission and rotation characteristics, the attenuation effect on the wall or inter-floor obstacle is small. Therefore, it is effective to use for communication of an air conditioner system having a plurality of units that are disposed in a building partitioned by a wall.

Meanwhile, the wireless communication module 120 may use a frequency of a 700 MHz band to a 900 MHZ band among the Sub-GHz bands. For example, the wireless communication module 120 may communicate according to a 802.15.4 g standard (SUN), and a 802.11ah standard (Wi-Fi HaLow).

In addition, the wireless communication module 120 communicates by using any one of a 400 MHz band and a 900 MHz band which are unlicensed bands that can be used for a low-power wireless station, among the Sub-GHz bands. The wireless communication module 120 may selectively use frequencies of 400 MHZ and 900 MHZ bands, in response to different regulations according to a region or country.

It is more preferable that the wireless communication module 120 communicates by using a frequency band of 900 MHz among the previously disclosed frequency bands, in consideration of inter-floor communication and antenna length.

According to an embodiment, the wireless communication module 120 may further include a communication module such as ZigBee, Bluetooth, NFC, which is a short-range communication method.

The wireless communication module 120 may include a plurality of communication modules, and may communicate through the same or different communication module when communicating with an outdoor unit and other indoor unit, communicating with a remote controller, and communicating with a controller. The wireless communication module 120 selectively changes a communication method in response to a communication target, so that the wireless communication module 120 can communicate in different communication methods according to the target.

When different channels are used for communication with the indoor unit and communication with the controller, the wireless communication module 120 may transmit/receive data by setting a channel according to a desired communication target respectively.

According to the Radio Law regulations of the Republic of Korea, for the frequency band of 400 MHz or 900 MHz, for radio equipment for a specific small power radio station for data transmission, 21 channels of 424.7 MHz to 424.95 MHz, 11 channels of 447.8625 MHz to 447.9875 MHz, and 32 channels of 917 to 923.5 MHz for radio equipment such as RFID/USN are exist, and thus, communication can be performed using these channels.

Reviewing the unlicensed frequency bands for each country, North America and South America can use 902 to 928 MHz (FCC Part 15.247), Europe can use 433 MHz, 915 MHz, 863 to 868 MHz (ETSIEN300220), Japan can use 920 to 928 MHz (ARIB STD-T108), China can use 920 MHz, Korea can use 424 to 447 MHz, 917 to 923.5 MHz (KC), India can use 865 to 867 MHz (GSR 564(E)), Australia can use 433, 915 MHz, South Africa can use 433 MHz, and 2.4 GHz and 5.725 GHz can be used in common all over the world.

In addition, when North and South America use 902 to 928 MHz, Europe uses 863 to 868 MHz, Japan uses 920 to 928 MHz, Korea uses 917 to 923.5 MHz, India uses 865 to 867 MHz, and 2.4 GHz and 5.725 GHz are used in common all over the world, communication can be achieved at a transmission speed of 50 kbps or more.

Since obstacle such as inter-floor wall and furniture exists in a building, it is necessary to use a frequency band in which signals can reach a certain distance or more while passing through the obstacles in the building.

Among the Sub-GHz bands, the ISM bands (100 MHz, 200 MHz, 400 MHz, and 900 MHz) have an advantage in that inter-floor communication is possible due to excellent penetration characteristics inside the building. However, the length of the antenna is determined according to the band of the transmission frequency, and in the case of the 100 MHz and 200 MHz bands, the antenna becomes considerably longer, and thus limiting installation.

In addition, in the 400 MHz band, the length of the antenna becomes longer than that in the 900 MHz frequency band.

Accordingly, it is preferable that the wireless communication module 120 communicates by using a frequency band of 900 MHz among the previously disclosed frequency bands, in consideration of inter-floor communication and antenna length.

The air conditioner system according to an embodiment of the present disclosure may include a plurality of units. For example, the air conditioner system may include one or more outdoor units and a plurality of indoor units.

In addition, the units included in the air conditioner system may perform wireless communication with each other.

Meanwhile, considering the installation environment of the air conditioner system in which the outdoor unit is disposed in the basement, the roof, outdoors, etc., it is impossible to implement smooth wireless communication between units by using the existing short-range wireless communication such as WiFi and Zigbee.

Accordingly, the air conditioner system according to an embodiment of the present disclosure may implement direct/indirect communication between units in various environments such as home/building, through long-distance wireless communication of a Sub-GHz band.

In addition, considering the installation environment of the air conditioner system, in order to secure the reliability of the communication quality, it is necessary to check and apply a wireless communication modulation method having a communication reliability against obstacle and a reliability that is strong even with changes in a surrounding environment such as an object, a movement of people, and a change of building structure.

In addition, by efficiently using limited wireless frequency resources, in order to install a large number of units in an area, it is necessary to enhance the communication speed compared to the existing long-distance wired communication.

Therefore, the present disclosure proposes a long-distance wireless communication technology for communication between units in a building having an optimal solution for wireless communication that can be installed more easily at low cost, monitor and diagnose defects indoors freely without any restrictions on a location, and pass through the walls and floors in the building.

To this end, a plurality of units included in the air conditioner system according to an embodiment of the present disclosure may include a wireless communication module 120 for wirelessly communicating between the plurality of units at a frequency of a sub GHz band.

Figure 7:
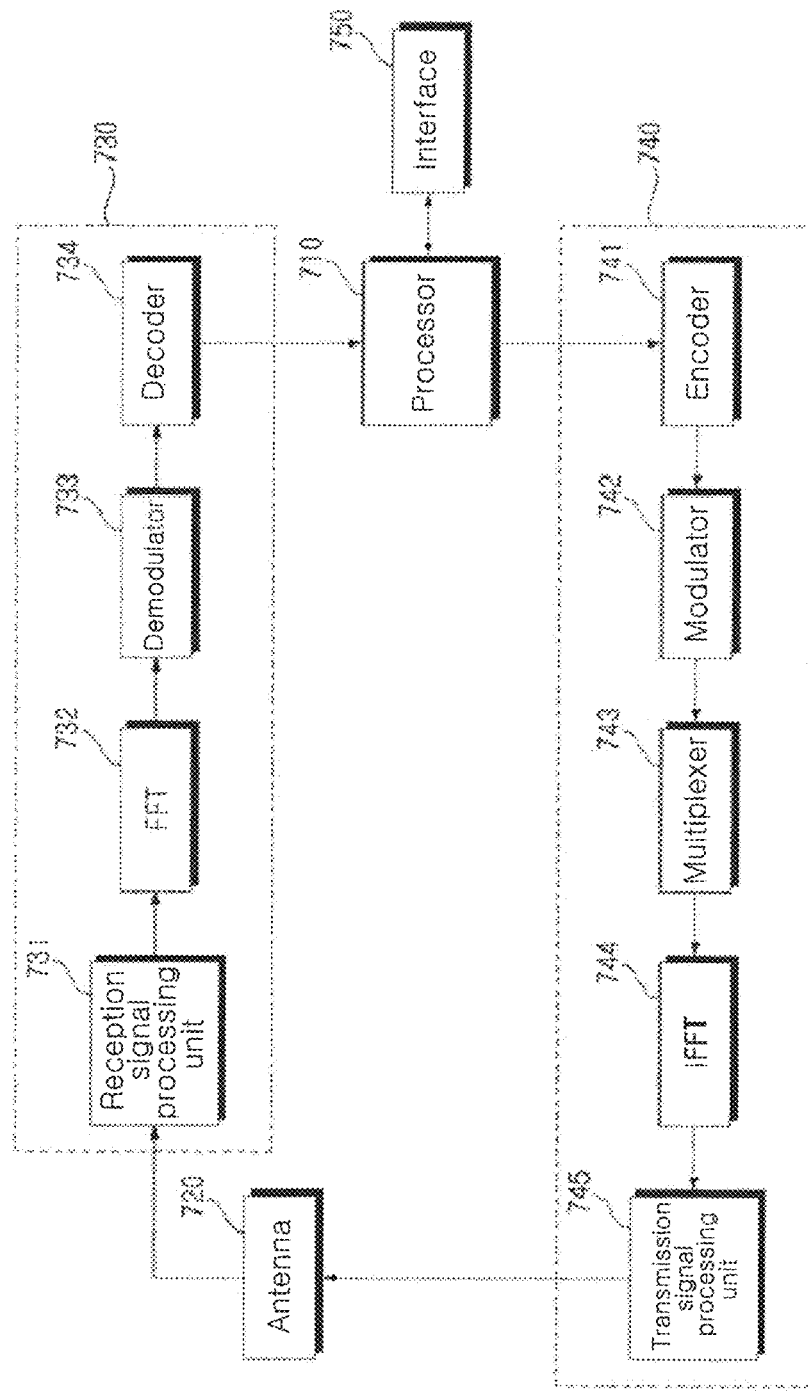
FIG. 7 is a block diagram schematically illustrating a control configuration of a wireless communication module according to an embodiment of the present disclosure.

FIG. 7 is a block diagram schematically illustrating a control configuration of a wireless communication module according to an embodiment of the present disclosure.

Referring to FIG. 7, the wireless communication module 120 may include an antenna 720, a transmitter 740, a receiver 730, a processor 710, and an interface 750.

The processor 710 may control the overall operation of the wireless communication module 120.

In addition, the processor 710 may control the transmitter 740 to output a certain signal through the antenna 720.

In addition, the processor 710 may control the receiver 730 to process a signal received through the antenna 720.

The antenna 720 may be a PCB antenna having an antenna pattern that is formed in a printed circuit board (PCB). The PCB antenna has a higher degree of design freedom than other method, and a radiation pattern that is uniform by adjusting the amount of ground source.

Meanwhile, the transmitter 740 may include an encoder 741 for encoding a certain signal, and a modulator 742 modulates the signal encoded by the encoder 741 according to an orthogonal frequency division multiplexing OFDM method using a multicarrier.

Meanwhile, the antenna 720 may output a signal based on the signal modulated by the modulator 742.

The certain signal is input to the encoder 741 as a binary signal. The encoder 741 may encode an input signal and output encoded data streams.

The orthogonal frequency division multiplexing (OFDM) is a multi-carrier modulation method, and is advantageous in high-speed data transmission and has the advantage of being robust against multi-path loss.

The orthogonal frequency division multiplexing (OFDM) is a method of multiplexing a high-speed transmission signal by modulating it with hundreds or more orthogonal narrow-band subcarriers.

The orthogonal frequency division multiplexing (OFDM) is a transmission technique that performs modulation and multiplexing together, is a multi-carrier modulation technology in that a high-speed source data stream of a single input is divided to be loaded on multiple carriers and transmitted, and is a multiplexing technology in terms of simultaneous transmission through multi channels.

In the orthogonal frequency division multiplexing (OFDM), a data stream having a high data rate is divided into a large number of data streams having a low data rate, and these are simultaneously transmitted using a plurality of carriers.

Since orthogonality exists between the plurality of carriers, even if the frequency components of the carriers overlap each other, detection at a receiving end is possible.

The orthogonal frequency division multiplexing (OFDM) has a structure in which high-speed data that is vulnerable to scattered reflected waves is transmitted in parallel as low-speed data that is strong in reflected waves, and has an advantage of selectively scheduling each of sub-carriers.

In some embodiments, the transmitter 740 may further include a multiplexer 743 for multiplexing the modulated signal. Alternatively, the transmitter 740 may further include a serial-to-parallel converter (not shown) for converting the multiplexed signal into a parallel signal. Alternatively, the transmitter 740 may further include a multiplexer 743 and a serial-to-parallel converter.

The serial-to-parallel converter may convert serially input symbol columns into a parallel form.

For example, a data stream having a high data rate is converted into a plurality of data streams having a low data rate through the serial-to-parallel converter, and the plurality of data streams converted into a parallel form may be loaded on subcarriers having mutual orthogonality and transmitted.

The transmitter 740 may further include a transmission signal processing unit 745. The transmission signal processing unit 745 may load an OFDM-modulated signal on a sub-carrier through frequency shift and transmit it through the antenna 720.

Meanwhile, the receiver 730 may include a demodulator 733 that demodulates a signal received from the antenna 720 by the orthogonal frequency division multiplexing method, and a decoder 734 that decodes the signal demodulated in the demodulator 733.

The receiver 730 may further include a reception signal processing unit 731. The reception signal processing unit 731 may extract a plurality of characteristic information by frequency shifting the carrier wave received from the antenna 720.

In some embodiments, the receiver 730 may further include a parallel-to-serial converter (not shown), and a parallel signal converted by the parallel-to-serial converter is transmitted to the demodulator 733.

In some embodiments, the transmitter 740 may further include an inverse fast Fourier transform unit 744 that performs an Inverse Fast Fourier Transform (IFFT) on the modulated signal, and the receiver 730 may further include a Fourier transform unit 732 that performs a Fast Fourier Transform (FFT) on the signal received from the antenna 720.

After modulation, the inverse fast Fourier-transformed signal may be transmitted through the antenna 720, and the signal received through the antenna 720 may be demodulated after being fast Fourier-transformed.

Accordingly, efficient digital implementation of the modulator 742 and the demodulator 733 is possible. In addition, signal processing can be smoothed by simply converting the channel into flat-fading, by performing signal processing in a frequency domain for a channel exhibiting a frequency-selective fading phenomenon.

According to an embodiment, the wireless communication module 120 may further include a duplexer (not shown) which is a switching element connecting the antenna 720 and the transmitter 740 or the receiver 730. The duplexer is an element that separates time or frequency according to a method, and may connect the antenna 720 to the transmitter 740 or the receiver 730.

Meanwhile, the wireless communication module 120 according to an embodiment of the present disclosure can communicate by using a signal of the 700 Mhz to 900 Mhz frequency bands which are a frequency, among sub 1 GHz frequencies, that allows long-distance (open space 1 km) communication while the communication speed is faster than the existing wired communication (9.6 kbps).

More preferably, the wireless communication module 120 according to an embodiment of the present disclosure may communicate by using a signal of a 900 Mhz frequency band, in consideration of inter-floor communication and antenna length.

According to an embodiment of the present disclosure, the antenna 720 may be installed inside the unit. For example, the antenna 720 may not protrude or be attached to an external, but may be disposed inside a main body case of the outdoor unit or the indoor unit.

In particular, the antenna included in the indoor unit may be disposed inside the main body case of the indoor unit. Accordingly, it is possible to prevent the antenna protruding or being attached to an external from negatively affecting a room interior, and to satisfy the esthetic sense.

In the air conditioner system, a plurality of units may transmit and receive data in a mutual wireless communication method. According to an embodiment of the present disclosure, the plurality of units may be dispersedly arranged in at least two or more floors. For example, the outdoor unit may be disposed in a roof of a building, and the indoor unit may be disposed in any floor inside the building. In addition, a plurality of indoor units may be dispersedly arranged in several floors.

Accordingly, the plurality of units are not installed in a single floor, but are respectively installed in a plurality of floors to transmit and receive data. Since obstacles such as inter-floor structure, wall, and furniture exist in a building, it is necessary to use a frequency band that a signal can reach over a certain distance while passing through the obstacles in the building.

The antenna 720 may be selectively used according to a frequency band used from among the 700 MHz band to the 900 MHz band of the Sub-GHz band. The shape of the antenna may be changed according to the frequency band used.

The antenna 720 may transmit a signal output from the transmitter 740 into the air, and receive a signal of a specified frequency band in the air to apply to the receiver 730.

The transmitter 740 and the receiver 730 may control the output of a signal to be transmitted according to a control command of the processor 710. The transmitter 7405 may adjust the output of a signal by controlling output impedance, i.e., the impedance of the antenna 720 to have a set value. The transmitter 740 and the receiver 730 may adjust impedance according to a frequency band of a signal to be transmitted and received through the antenna 720. Impedance matching may use the most well known 500 matching method.

According to an embodiment, the antenna 720 may be a multiple input multiple output (MIMO) antenna, and transmission capacity may be increased by transmitting data in parallel through each antenna.

The transmitter 740 and the receiver 730 are a communication module supporting MIMO, and multiple input/output is possible through a plurality of connected antennas. The transmitter 740 may transmit data to a plurality of paths through a plurality of antennas, and the receiver 730 may detect a signal received through each path.

MIMO is an antenna system that enables to accomplish spatial multiplexing, space diversity, and beam forming.

Spatial multiplexing is a technique for improving transmission speed by transmitting multiple information through a plurality of transmission antennas, space diversity is a technique for controlling errors by transmitting the same information multiple times through multiple transmission antennas, and beamforming is a technique that reduces interference by transmitting radio waves in a desired direction.

The wireless communication module 120 may transmit and receive signals using a plurality of antennas through MIMO to enable mutual communication between a plurality of units distributed and installed in a building or the like.

The processor 710 may control the data of the unit 100 applied through the interface 750 to be transmitted as a signal of a specified frequency band, as a set output. In addition, the processor 710 may process a signal received through the antenna 720 and apply it to the unit. In addition, the processor 710 may control data to be converted into a specified form according to a communication method used.

The interface 750 connects the unit 100 and the communication unit 120. For example, the wireless communication module 120 may be connected to the control unit 110 of the unit 100 through the interface 750, and the wireless communication module 120 may operate under the control of the control unit 110.

In the case of the conventional wired communication, a plurality of units are hierarchically connected according to a connection state of a communication line, rather than being connected one-to-one between a plurality of units.

Accordingly, since the data of the indoor unit cannot be directly transmitted to the controller or the remote control device, a time delay occurs in data transmission.

In addition, there is a limitation in that the processing load of the outdoor unit increases and it takes a lot of time to transmit data according to the number of connected indoor units.

Accordingly, the units included in the air conditioner system according to an embodiment of the present disclosure may perform mutual wireless communication.

Preferably, the units included in the air conditioner system according to an embodiment of the present disclosure may perform mutual wireless communication using a frequency band of Sub-GHz band.

More preferably, the units included in the air conditioner system according to an embodiment of the present disclosure include a wireless communication module 120 for performing mutual wireless communication using a frequency band of Sub-GHz band, and the wireless communication module 120 may include a PCB antenna that is easy to manage radiation pattern and is advantageous for securing gain, and may use an Orthogonal Frequency Division Multiplexing (OFDM) modulation method having less inter-channel interference in multi-channels.

Conventional 2.4 Ghz and 5 Ghz bands are for indoor short-distance use within about 30 m, and have disadvantages in that they cannot pass through thick walls or that signal strength is rapidly reduced even in a case of thin walls.

However, according to an embodiment of the present disclosure, wireless communication is performed by using the frequency band of the Sub-GHz band, so that communication can be performed at a speed of about 150 Kbps or more, which is 15 times faster than the wired communication speed of about 9.6 Kbps, while communication is possible even if there is an obstacle between floors.

In addition, since it is possible to eliminate the work process of connecting the communication line and the communication line, the installation cost and installation time are reduced, thereby reducing the overall cost.

Figure 8:
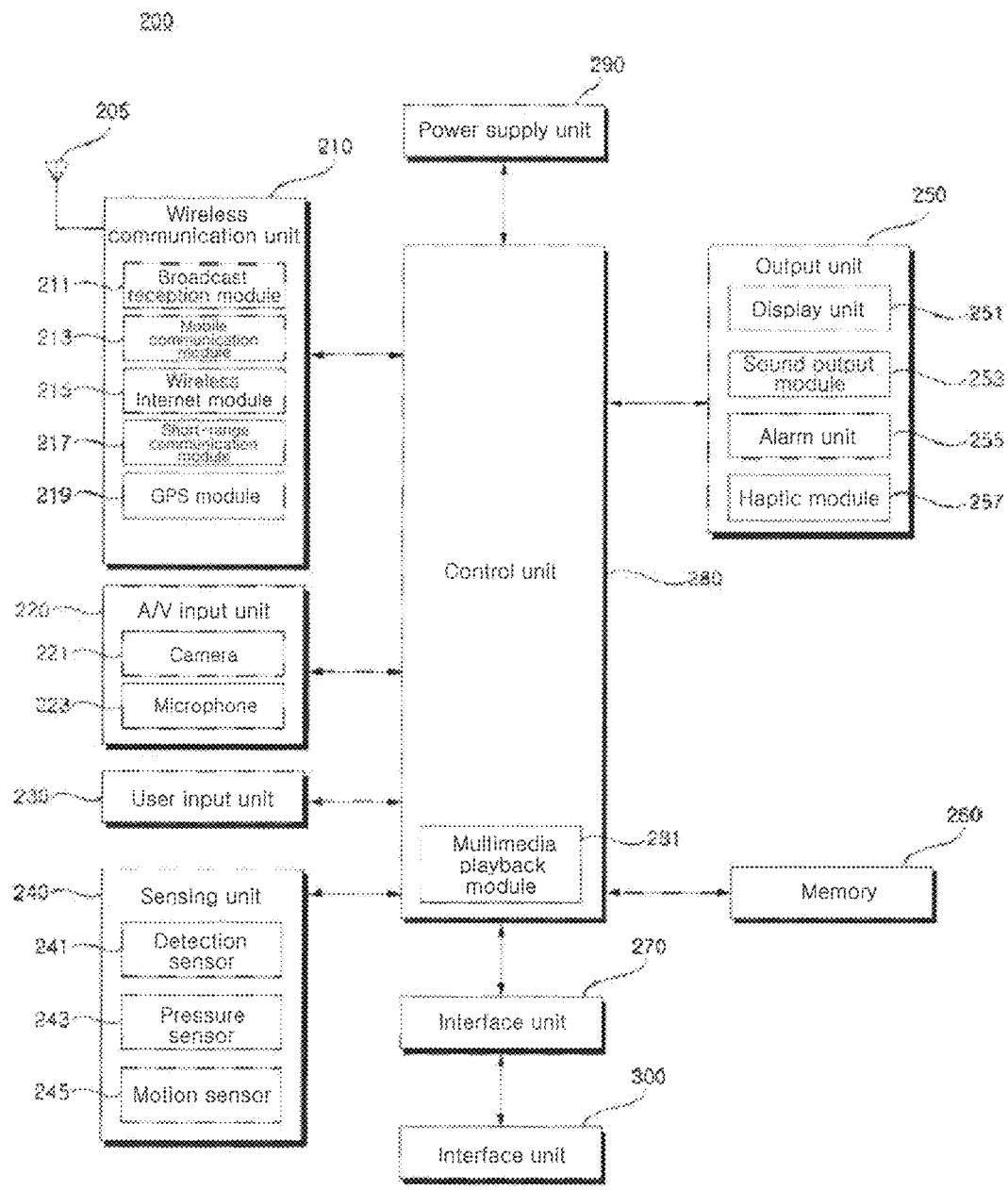
FIG. 8 is a simplified internal block diagram of a mobile terminal according to an embodiment of the present disclosure.

FIG. 8 is a simplified internal block diagram of a mobile terminal according to an embodiment of the present disclosure.

Referring to FIG. 8, the mobile terminal 200 may include a wireless communication unit 210, an audio/video (A/V) input unit 220, a user input unit 230, a sensing unit 240, an output unit 250, a memory 260, an interface unit 270, a control unit 280, and a power supply unit 290.

The mobile terminal 200 according to an aspect of the present disclosure may include a wireless communication module 300 that wirelessly communicates with a plurality of electronic devices. The wireless communication module 300 may have the same internal configuration as the above mentioned wireless communication module 120.

In some embodiments, the wireless communication module 300 may be configured as one block of the wireless communication unit 210.

In the case of wireless communication with each unit 100 in the air conditioner system in the Sub-GHz band, the wireless communication module 300 supporting the Sub-GHz band wireless communication may be used. Since it is practically difficult that all general-purpose mobile terminals 200 are released with a built-in wireless communication module 300 supporting a wireless communication of Sub-GHz band, it is preferable to connect and use a dedicated wireless communication module 300.

In this case, the wireless communication module 300 may be connected through the interface unit 270 or may be connected through the wireless communication unit 210.

Meanwhile, the wireless communication unit 210 may include a broadcast reception module 211, a mobile communication module 213, a wireless Internet module 215, a short-range communication module 217, a GPS module 219, and the like.

The broadcast reception module 211 may receive at least one of a broadcast signal and broadcast-related information from an external broadcast management server through a broadcast channel. In this case, the broadcast channel may include a satellite channel, a terrestrial channel, and the like.

The broadcast signal and/or broadcast-related information received through the broadcast reception module 211 may be stored in the memory 260.

The mobile communication module 213 transmits/receives a wireless signal to and from at least one of a base station, an external terminal, and a server on a mobile communication network. Here, the wireless signal may include a voice call signal, a video call signal, or various types of data according to text/multimedia message transmission/reception.

The wireless Internet module 215 refers to a module for wireless Internet access, and the wireless Internet module 215 may be built-in the mobile terminal 200 or be provided in an external. For example, the wireless Internet module 215 may perform WiFi-based wireless communication or WiFi Direct-based wireless communication.

The short-range communication module 217 is for short-range communication, and may support a short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies.

Such a short-range communication module 217 may support wireless communication between the mobile terminal 200 and the wireless communication system, between the mobile terminal 200 and other mobile terminal 200, or between the mobile terminal and networks where other mobile terminal or an external server is located, through wireless area networks. The wireless area networks may be wireless personal area networks.

The Global Position System (GPS) module 219 may receive location information from a plurality of GPS satellites.

Meanwhile, the wireless communication unit 210 may exchange data with a server by using one or more communication modules.

The wireless communication unit 210 may include an antenna 205 for wireless communication, and may include an antenna for receiving a broadcast signal in addition to an antenna for a call.

The audio/video (A/V) input unit 220 is for inputting an audio signal or a video signal, and may include a camera 221, a microphone 223, and the like.

The user input unit 230 generates key input data input by a user so as to control the operation of the terminal. To this end, the user input unit 230 may include a key pad, a dome switch, a touch pad (resistive/capacitive), and the like. In particular, when the touch pad forms a mutual layer structure with the display unit 251, it may be referred to as a touch screen.

The sensing unit 240 may generate a sensing signal for controlling the operation of the mobile terminal 200 by detecting the current state of the mobile terminal 200 such as the opening/closing state of the mobile terminal 200, the location of the mobile terminal 200, and the contact of user.

The sensing unit 240 may include a detection sensor 241, a pressure sensor 243, and a motion sensor 245. The motion sensor 245 may detect a movement or location of the mobile terminal 200 by using an acceleration sensor, a gyro sensor, a gravity sensor, or the like. In particular, the gyro sensor is a sensor for measuring angular velocity, and may detect a direction (angle) that is turned with respect to a reference direction.

The output unit 250 may include a display unit 251, a sound output module 253, an alarm unit 255, a haptic module 257, and the like.

The display unit 251 displays and outputs information processed by the mobile terminal 200.

Meanwhile, when the display unit 251 and the touch pad form a mutual layer structure to be configured as a touch screen, the display unit 251 may be used as an input device that enables to input information by a user's touch, in addition to as an output device.

The sound output module 253 outputs audio data received from the wireless communication unit 210 or stored in the memory 260. Such a sound output module 253 may include a speaker, a buzzer, and the like.

The alarm unit 255 outputs a signal for notifying the occurrence of an event in the mobile terminal 200. For example, the signal may be output in the form of vibration.

The haptic module 257 generates various tactile effects that a user can feel. A typical example of the tactile effect generated by the haptic module 257 is a vibration effect.

The memory 260 may store a program for processing and control of the control unit 280, or may serve to temporarily store the input or output data (e.g., phonebook, message, still image, video, etc.).

The interface unit 270 serves as an interface with all external devices connected to the mobile terminal 200. The interface unit 270 may receive data or receive power from such an external device and transmit it to each component inside the mobile terminal 200, and may allow the data inside the mobile terminal 200 to be transmitted to an external device.

The control unit 280 generally controls the overall operation of the mobile terminal 200 by controlling the operation of each unit. For example, it may perform related control and processing for voice call, data communication, video call, and the like. In addition, the control unit 280 may include a multimedia playback module 281 for multimedia playback. The multimedia playback module 281 may be configured as hardware in the control unit 280 or may be configured as software separately from the control unit 280.

The power supply unit 290 receives external power and internal power under the control of the control unit 280 to supply power necessary for the operation of each component.

Meanwhile, a block diagram of the mobile terminal 200 shown in FIG. 8 is a block diagram for an embodiment of the present disclosure. Each component in the block diagram may be integrated, added, or omitted according to the specification of the mobile terminal 200 that is actually implemented.

That is, if necessary, two or more components may be combined into one component, or one component may be subdivided into two or more components. In addition, the function performed in each block is for explaining the embodiment of the present disclosure, and the specific operation or device does not limit the scope of the present disclosure.

Figure 9:
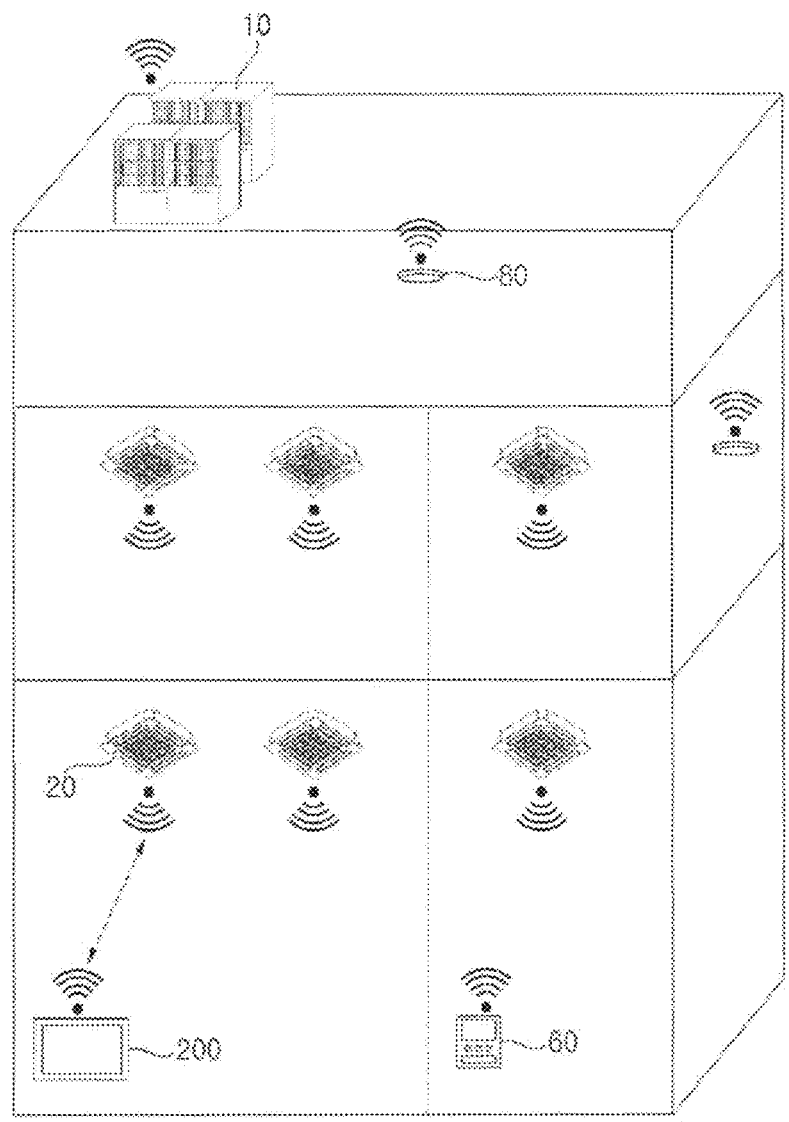
FIG. 9 is a diagram referenced in a description of an air conditioner system according to an embodiment of the present disclosure.

FIG. 9 is a diagram referenced in the description of the air conditioner system according to an embodiment of the present disclosure.

Referring to FIG. 9, the air conditioner system according to an embodiment of the present disclosure may include an indoor unit 20, an outdoor unit 10, a remote controller 60, a wireless sensor 80, and a mobile terminal 200.

In addition, the air conditioner system may further include a unit such as a controller, a ventilation device, a defrosting device, a humidifier, and a heater.

The remote controller 60 may be connected to the indoor unit 20 or the outdoor unit 10 by wire to transmit a control signal, but more preferably communicate wirelessly.

As described with reference to FIGS. 1 to 8, the mobile terminal 200 and the controller (refer to 50 in FIG. 1) are wirelessly connected to units such as the indoor unit 20 and the outdoor unit 10 to control each unit.

When data information is requested from the mobile terminal 200 or the controller 50, the indoor unit 20 and the outdoor unit 10 may transmit the requested data information. The indoor unit 20 and the outdoor unit 10 may transmit data with different contents according to the request of the mobile terminal 200 or the controller 50.

The indoor unit 20 and the outdoor unit 10 receive a control signal from the mobile terminal 200 and the controller 50. When the indoor unit 20 and the outdoor unit 10 receive the control signal from the mobile terminal 200 or the controller 50, they may report to the mobile terminal 200 or the controller 50 that the control signal has been received, but the present disclosure is not limited thereto, and may vary depending on the communication method adopted by the air conditioner system.

When the indoor unit 20 and the outdoor unit 10 receive the control signal, they may perform a corresponding operation. The indoor unit 20 and the outdoor unit 10 may receive a storage cycle or storage term for storing a data signal including an operation state from the mobile terminal 200 or the controller 50. The indoor unit 20 and the outdoor unit 10 may store data information cyclically or when an error occurs.

When an error occurs, the indoor unit 20 and the outdoor unit 10 may extend the storage term of recently stored data information. The indoor unit 20 and the outdoor unit 10 may include a storage medium for storing data information. For example, the indoor unit 20 and the outdoor unit 10 may cyclically store data information, and when an error occurs, may store recently stored data information separately from other information, but the present disclosure is not limited thereto.

The data information may include an operating state of the indoor unit 20 or the outdoor unit 10. For example, the data information may include air temperature, condensation temperature, evaporation temperature, discharge temperature, heat exchanger temperature, etc., but is not limited thereto, and may include broad information related to the operation of the indoor unit 20 or the outdoor unit 10.

The indoor unit 20 or the outdoor unit 10 may transmit data information including an operating state to the mobile terminal 200 or the controller 50. When the indoor unit 20 or the outdoor unit 10 is turned on/off, an operating state is changed, or an error occurs, the indoor unit 20 or the outdoor unit 10 may transmit this to the mobile terminal 200 or the controller 50. The indoor unit 20 or the outdoor unit 10 may communicate with the mobile terminal 200 or the controller 50, when an event occurs or according to a certain cycle.

The mobile terminal 200 or the controller 50 may receive detailed cycle data capable of fault diagnosis for each unit in real time and display it on a screen.

When displaying data information in characters such as numerical values, the mobile terminal 200 or the controller 50 may display data information of the indoor unit 20, data information of the outdoor unit 10, valve information of a pipe connecting the indoor unit 20 and the outdoor unit 10, and the like.

In some embodiments, when displaying the valve information, the mobile terminal 200 or the controller 50 may display the opening or closing of the valve by using a color or a picture. For example, the mobile terminal 200 or the controller 50 may display blue when the valve is open, display gray when the valve is closed, or display the open or closed shape of the valve as a picture, but not limited to the type of the color or picture.

When displaying data information as time-series image, the mobile terminal 200 or the controller 50 may select the outdoor unit 10 or the indoor unit 20 to be displayed.

When selecting the outdoor unit 10 to be displayed among a plurality of outdoor units 10, the mobile terminal 200 or the controller 50 may select the indoor unit 20 to be checked among one or more indoor units 20 connected to the selected outdoor unit 10.

When selecting the outdoor unit 10 and the indoor unit 20, the mobile terminal 200 or the controller 50 may receive data information including the operation state of the selected indoor unit 20 and the connection state of the selected outdoor unit 10 and the selected indoor unit 20. The connection state may include the connection state of the pipe, the flow inside the pipe, the on/off of the valve, and the like, but is not limited thereto.

The mobile terminal 200 or the controller 50 may display the operation states of the selected outdoor unit 10 and the indoor unit 20 in time-series with a change in a picture or a change in color. The mobile terminal 200 or the controller 50 may display a pipe state connecting the selected outdoor unit 10 and indoor unit 20 or a valve state.

The mobile terminal 200 or the controller 50 may check the operating state of the indoor unit 20 or the outdoor unit 10 in real time. When checking the operating state of the indoor unit 20 or the outdoor unit 10 in real time, the mobile terminal 200 or the controller 50 may receive data information in real time and display the received data information.

The wireless sensor 80 may detect an air state and transmit air state data corresponding to the detected air state.

The air state may be a concept including at least one of temperature, humidity, atmospheric pressure, an amount of dust, an amount of carbon dioxide, and an amount of oxygen. Accordingly, the wireless sensor 80 may measure at least one of the temperature, the humidity, the atmospheric pressure, the amount of dust, the amount of carbon dioxide, and the amount of oxygen.

The air state data may include data on at least one of the temperature, the humidity, the atmospheric pressure, the amount of dust, the amount of carbon dioxide, and the amount of oxygen.

The wireless sensor 80 may transmit air state data in a broadcast method. The broadcast method may be a method of transmitting data without specifying a reception target. The wireless sensor 80 transmits the air state data to a specific communication network without specifying a reception target, thereby saving energy, motion, and parts necessary for setting a reception target of data.

The air state data broadcasted by the wireless sensor 80 may be transmitted to the outdoor unit 100 or the indoor unit 200.

In addition, the air state data broadcasted by the wireless sensor 80 may be transmitted to the controller 50 or the mobile terminal 200.

In some embodiments, the wireless sensor 80 may also include the aforementioned wireless communication module 120 in the same manner.

The wireless sensor 80 may include the wireless communication module 120 to transmit sensing data to at least one unit among a plurality of units.

Alternatively, one or more wireless sensors 80 for transmitting sensing data to at least one unit among the plurality of units may include an encoder for encoding a certain signal, a modulator for modulating the signal encoded by the encoder according to an orthogonal frequency division multiplexing method using a multicarrier, and one or more antennas that have an antenna pattern formed on a printed circuit board (PCB) and output a signal based on the modulated signal.

That is, the wireless sensor 80 according to an embodiment of the present disclosure includes remaining components excluding the receiver 730 in the wireless communication module 120 to perform a function of transmitting sensing data.

The indoor unit 20 or the outdoor unit 10 may perform an appropriate air conditioning operation, based on the received air state data.

The indoor unit 20 or the outdoor unit 10 may operate according to a control signal received from the controller 50 or the mobile terminal 200.

As shown in FIG. 9, when the units in the air conditioner system are wirelessly connected, there is an advantage that installation cost and installation time can be significantly reduced compared to the case of wired connection.

In addition, in order to check and control information of any one unit, since it is possible to directly communicate with a control target unit to control the unit, without going through a specific unit such as the controller 50, there is an advantage in terms of communication time and ease of use.

Units included in the air conditioner system according to an embodiment of the present disclosure may include a wireless communication module 120 for performing mutual wireless communication using a frequency band of Sub-GHz band. In addition, the wireless communication module 120 includes a PCB antenna that facilitates radiation pattern management and is advantageous for securing gain, and may use an Orthogonal Frequency Division Multiplexing (OFDM) modulation method having a less inter-channel interference in multi-channels.

Accordingly, even in an air conditioner system installation environment in which the outdoor unit is installed in the basement or on the roof of a building, and the units are distributed and obstacles such as floor and wall generally exist between the units, wireless communication between the units can be performed smoothly.

Meanwhile, depending on a high-rise building, a large-area building, or other installation environments, a wireless communication shadow area in which wireless communication is not performed smoothly may occur. In this case, it may be necessary to install a repeater capable of retransmitting a received wireless signal in order to resolve a wireless communication shadow area.

Accordingly, there is a need for a method for determining whether a repeater is necessary in a wireless communication environment and efficiently installing the repeater when necessary.

As described with reference to FIGS. 1 to 9, the air conditioner system according to an embodiment of the present disclosure may include a plurality of units, and the plurality of units may be an outdoor unit, an indoor unit, and the like.

Meanwhile, the outdoor unit and the indoor units may be connected through a refrigerant pipe, and the outdoor unit and the indoor units that are connected through the refrigerant pipe may be set as a group.

In addition, it is possible to wirelessly communicate mutually between units that are set in the same group.

That is, wireless communication may be performed between an outdoor unit and an indoor unit within the same group, and wireless communication may be performed also between an indoor unit and an indoor unit.

For example, a certain outdoor unit and two or more indoor units are connected through a refrigerant pipe, and the certain outdoor unit and indoor units connected through the refrigerant pipe may be set as a group and wireless communication may be performed between units.

In this case, any one indoor unit among the indoor units of a certain group may be set as a repeater for retransmitting a wireless signal received from the outdoor unit.

Accordingly, it is possible to effectively prevent a situation in which a specific indoor unit cannot receive a wireless signal.

Meanwhile, a structure may be added to or changed in a building in which the air conditioner system is installed. Depending on the addition or change of the structure, the wireless communication environment may also vary. Accordingly, although the wireless communication performance was good at the time of installation, the wireless communication performance may be significantly reduced without a special failure during use.

Figure 10:
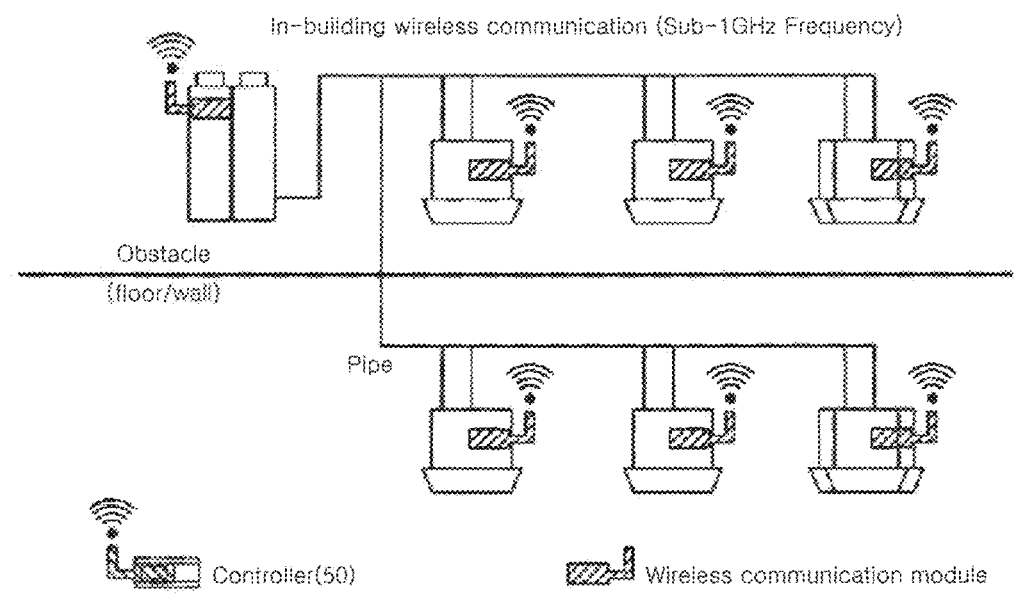
FIG. 10 is a diagram schematically illustrating wireless communication inside a building according to an embodiment of the present disclosure.

Hereinafter, a Sub-GHz band wireless communication system will be described with reference to FIGS. 10 and 11.

Since a conventional commercial wireless communication uses a 2.4 GHz or 5 GHz frequency band, there is a disadvantage in that long-distance wireless communication is difficult in a structure of a plurality of floors and walls in a building. Accordingly, according to an embodiment of the present disclosure, in order to enable long-distance wireless communication between the outdoor unit 10 installed outside of a building and the indoor unit 20 installed inside the building, RF of a sub-1 GHz band is used.

Figure 11:
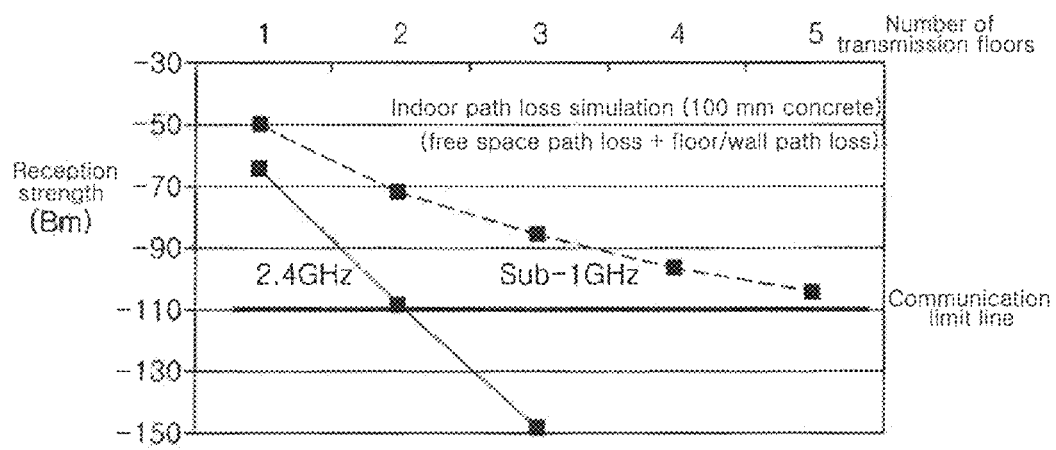
FIG. 11 is a diagram illustrating the number of transmission floors according to reception strength when using a Sub-GHz frequency band according to an embodiment of the present disclosure.

FIG. 11 is an indoor path loss simulation graph with respect to the reception intensity and the number of transmitted floors in the case of using the frequency of the existing 2.4 GHz band and the case of using the frequency of the Sub-GHz band according to an embodiment of the present disclosure. Referring to FIG. 11, it can be seen that the frequency of the Sub-GHz band according to an embodiment of the present disclosure can be received as it does not deviate from communication limit even if it passes through five floors, whereas the frequency of the 2.4 GHz band is difficult to communicate outside a communication limit line when it reaches two floors. As a result, in the case of the 2.4 GHz band, communication of a single vertical floor is possible, but it can be seen that communication between five floors or walls is possible when the frequency of the Sub-GHz band is used.

However, since the frequency bands of wireless device that can be opened without notification in each country are different, in actual implementation, the frequency bands should be set on the basis of the radio wave laws of each country. In the case of the Republic of Korea, the frequency bands used for wireless devices for wireless stations that can be opened without notification are different depending on the purpose, but 400 MHz and 900 MHz can be used for the frequency band for wireless communication of the indoor/outdoor unit and the controller of air conditioner. Therefore, in the case of the Republic of Korea, it is possible to implement the long-distance wireless communication using a frequency of the Sub-GHz band according to an embodiment of the present disclosure.

Hereinafter, a transmitter of the wireless communication unit 120 according to an embodiment of the present disclosure will be described with reference to FIGS. 12 to 14.

With the recent rise of personal information issues, it is important for wireless devices and services that provide wireless communication to secretly transmit and receive data. To solve this problem, transmission data is first ciphered using an optical orthogonal code used in CDMA, and the transmission data is secondarily ciphered using a narrowband chaotic signal.

Figure 12:
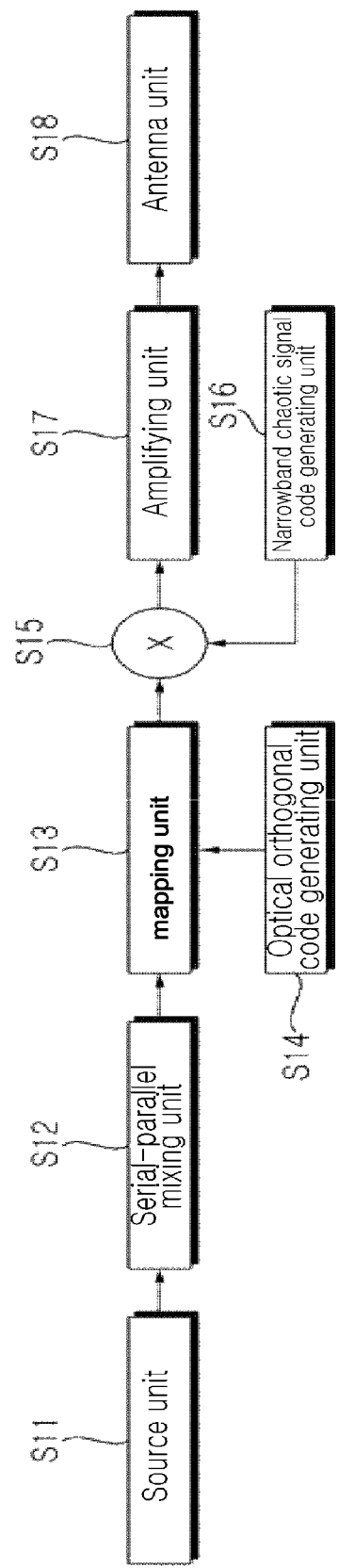
FIG. 12 is a diagram illustrating a configuration of a transmitting unit of a wireless communication unit according to an embodiment of the present disclosure.
Figure 13:
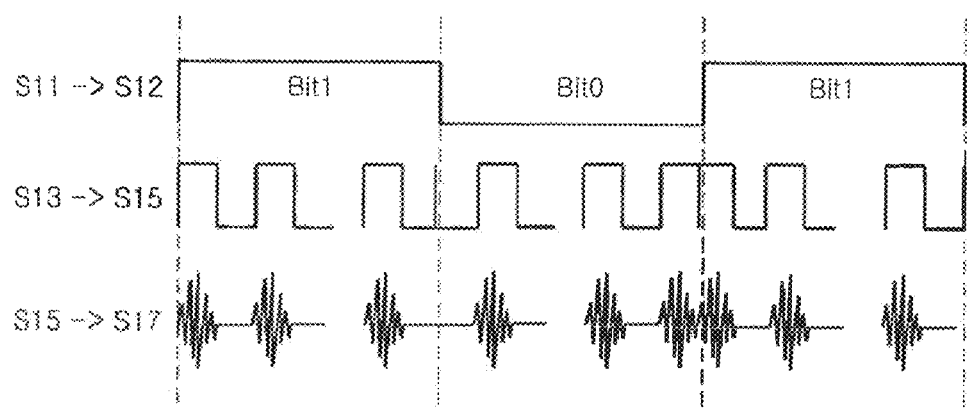
FIG. 13 is a diagram illustrating a process in which data is converted into a codeword through twice securing according to an embodiment of the present disclosure.
Figure 14A:
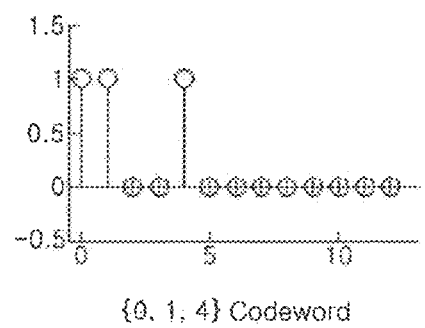
FIGS. 14A-14D are diagrams illustrating an example of codeword, an autocorrelation diagram, and a cross-correlation diagram.
Figure 14B:
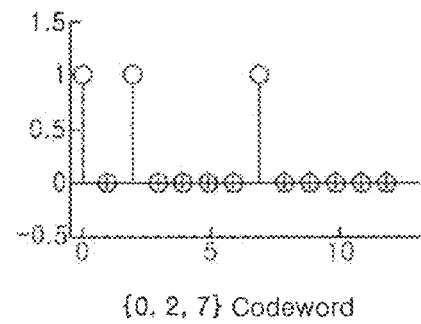
Figure 14C:
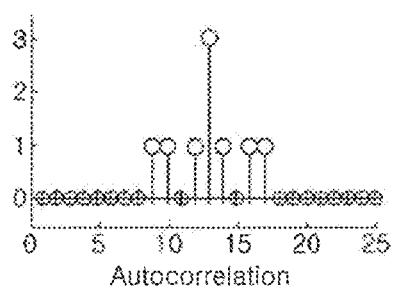
Figure 14D:
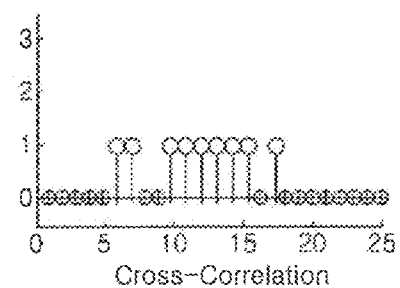

First, referring to FIG. 12, data to be transmitted is stored through a source unit S11. In the source unit, data to be transmitted consists of source information composed of bit 0 and bit 1. A serial-parallel mixing unit S12 converts the source information composed of bits into a symbol as a pre-process for converting the source information transmission data into a codeword.

A mapping unit S13 converts the data converted into symbol into a codeword. At this time, the data converted through an optical orthogonal code generating unit S14 is first ciphered. Referring to FIG. 14, an optical orthogonal code used in the present disclosure is defined as (n, w, $\lambda a$, $\lambda c$).

n is a length of codeword, w is the number of 1 contained in the codeword, and $\lambda a$ and $\lambda c$ are correlation characteristics of optical orthogonal code. Here, $\lambda a$ denotes a maximum magnitude of periodic auto-correlation side-lobes, and $\lambda c$ denotes a maximum magnitude of periodic cross-correlation.

FIG. 14 shows an example of an optical orthogonal code. FIG. 14A shows a codeword {0, 1, 4} with n=13, FIG. 14B shows a codeword {0, 2, 7} with n=13, FIG. 14C is an autocorrelation diagram of the two optical orthogonal codes, and FIG. 14D is a diagram illustrating a cross-correlation diagram of the two optical orthogonal codes. Determining from the above example, it can be seen that $\lambda a$ and $\lambda c$ become 1, respectively, and the maximum overlapping portion between the two codes becomes one even in an asynchronous situation. First ciphering of data through mapping and de-mapping of source information is possible by using the above method.

The data S15, which is first ciphered through the optical orthogonal code generating unit S14, is secondarily ciphered through a narrowband chaotic signal generating unit S16. Since the Sub-GHz frequency of the present disclosure is narrow in comparison with a channel bandwidth of existing 2.4 GHz or 5 GHz band, a narrowband chaotic signal is required, and the chaotic signal enables the transmission and reception of the ciphered signal by using complex information and chaos signals that are modulated into carrier signals by frequency shift keying.

The data secondarily ciphered through the narrowband chaotic signal generating unit S16 is transmitted to the receiver through an amplifier for amplifying data and a transmitting antenna unit S18 for transmitting the data amplified through the amplifier.

Figure 15:
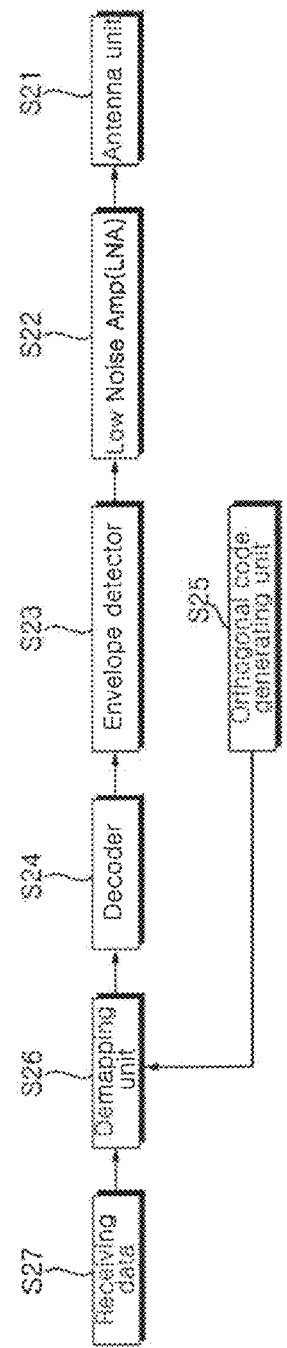
FIG. 15 is a diagram illustrating a configuration of a receiver of a wireless communication unit according to an embodiment of the present disclosure.
Figure 16:
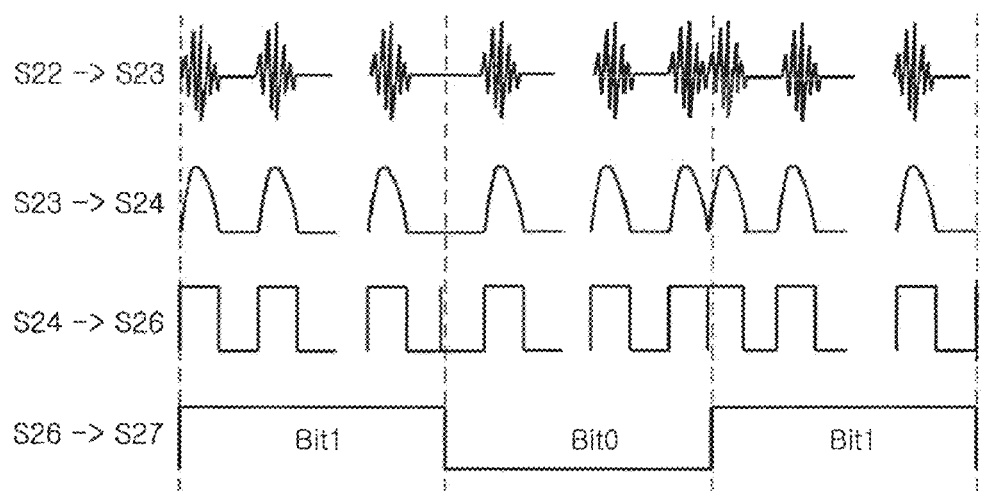
FIG. 16 is a diagram illustrating a process of demapping a codeword to data according to an embodiment of the present disclosure.

Hereinafter, a receiver of a wireless communication unit according to an embodiment of the present disclosure will be described with reference to FIGS. 15 and 16.

The ciphered data transmitted through the transmitting antenna unit S18 is received through a receiving antenna unit S21 of the receiver. Such received antenna minimizes the noise of the received signal and amplifies a ciphered data signal, through a low noise amplifier (LNA), so as to be received.

The data signal passed through a low noise amplifier is detected through an envelope detector S23. According to the embodiment of the present disclosure, the transmission data signal uses a chaotic signal instead of using an existing sine wave, so that secondary ciphering having excellent ciphering characteristics is possible. Further, a receiver implementing an inexpensive and simpler low-power communication system is configured by enabling inexpensive non-coherent reception, with a structure which is simple as it is not necessary to precisely match a phase.

As described above, the non-coherent received data signal through the envelope detection of the envelope detector is decoded in the form of codeword again by the decoder S24, and is restored in symbol units and bits again through the demapping unit S26. Such a restoration process can be checked through FIG. 16 which is shown in contrast with FIG. 13.

In the process of restoring through the existing demapping unit, a synchronization unit for chip synchronization, by using a general pseudo-noise code (PN code), is required in the receiver. However, according to the demapping unit S26 according to the embodiment of the present disclosure, since the optical orthogonal code through the orthogonal code generating unit S25 is used, as described above, the correlation in the data conversion process is excellent, so that an asynchronous receiver can be configured. Similarly, since there is no need to calculate bits according to synchronization in the receiver side, a cheaper and simpler receiver can be configured.

By receiving the data restored through the demapping unit (S27), communication between the indoor/outdoor unit of the air conditioner and the controller controlling the same is enabled.

The accompanying drawings are only for easy understanding of the embodiments described in the present specification, and it should be understood that the technical concept disclosed in the present specification is not limited by the accompanying drawings, and includes all modifications, equivalents and substitutes included in the spirit and scope of the present disclosure.

In addition, although the present disclosure has been described with reference to specific embodiments shown in the drawings, it is apparent to those skilled in the art that the present description is not limited to those exemplary embodiments and is embodied in many forms without departing from the scope of the present disclosure, which is described in the following claims. These modifications should not be individually understood from the technical spirit or scope of the present disclosure.

The invention claimed is:

1. An air conditioner, comprising:
a plurality of indoor units configured to be distributed and installed in a plurality of floors in a building;
a controller configured to monitor and control the plurality of indoor units; and
a wireless communication unit configured to transmit and receive data by the controller, the plurality of indoor units, and one outdoor unit using a wireless communication method, wherein the wireless communication unit comprises a transmitter and a receiver using a Sub-GHz band frequency, wherein the transmitter comprises:
an optical orthogonal code generator configured to first cipher source data using an optical orthogonal code; and
a narrow-band chaotic signal generator configured to secondarily cipher by using a chaotic signal, and wherein the source data is sequentially encrypted through the optical orthogonal code generator and the narrowband chaotic signal generator and then transmitted.

2. The air conditioner of claim 1, wherein the receiver further comprises:
an envelope detector configured to detect an envelope; and
a decoder configured to decode data received through the envelope detector in a form of a codeword.

3. The air conditioner of claim 2, further comprising a de-mapping unit configured to restore a codeword received through the envelope detector.

4. The air conditioner of claim 1, wherein the transmitter further comprises:
a source unit configured to constitute a transmission data source before the first ciphering;
a serial-parallel mixing unit configured to be in charge of a pre-processing process of converting transmission data of the source unit into a codeword; and
a mapping unit configured to convert the transmission data processed through the serial-parallel mixing unit into a codeword.

5. The air conditioner of claim 4, wherein the optical orthogonal code generator firstly ciphers the codeword converted through the mapping unit by using the optical orthogonal code.

6. The air conditioner of claim 1, wherein the transmitter further comprises:
an amplifying unit configured to amplify data encrypted through the first and second cipherings; and
a transmitting antenna unit configured to transmit the data amplified through the amplifying unit.

7. The air conditioner of claim 1, wherein the receiver further comprises:
a receiving antenna unit configured to receive data transmitted through the transmitter; and
a low-noise amplifying unit configured to remove noise of the data received through the receiving antenna unit and amplify a signal.

8. The air conditioner of claim 1, further comprising a storage unit configured to store control data for controlling operation, communication data for setting an address or a group for communication with other unit, data transmitted and received from the outside, and operation data generated or detected during operation.

9. The air conditioner of claim 1, further comprising an input unit configured to apply input data to the controller, when a user command or certain data is input.

10. The air conditioner of claim 1, further comprising an output unit configured to output audio or image.

* * * * *